United States Patent
Chen et al.

(10) Patent No.: US 9,670,341 B2
(45) Date of Patent: Jun. 6, 2017

(54) RUBBER COMPOSITIONS COMPRISING METAL CARBOXYLATES AND PROCESSES FOR MAKING THE SAME

(71) Applicant: Bridgestone Corporation, Tokyo (JP)

(72) Inventors: Yaohong Chen, Akron, OH (US); Toshihiro Uchiyama, Tokyo (JP); Arif O. Gozen, Akron, OH (US); Mindaugas Rackaitis, Massillon, OH (US)

(73) Assignee: Bridgestone Corporation, Chuo-ku (JP)

( * ) Notice: Subject to any disclaimer, the term of this patent is extended or adjusted under 35 U.S.C. 154(b) by 0 days.

(21) Appl. No.: 14/440,161

(22) PCT Filed: Nov. 4, 2013

(86) PCT No.: PCT/US2013/068296
§ 371 (c)(1),
(2) Date: May 1, 2015

(87) PCT Pub. No.: WO2014/071301
PCT Pub. Date: May 8, 2014

(65) Prior Publication Data
US 2015/0274939 A1    Oct. 1, 2015

Related U.S. Application Data

(60) Provisional application No. 61/722,002, filed on Nov. 2, 2012.

(51) Int. Cl.
| | |
|---|---|
| C08L 9/06 | (2006.01) |
| C08L 9/00 | (2006.01) |
| C08K 3/36 | (2006.01) |
| C08K 5/098 | (2006.01) |
| C08K 5/5415 | (2006.01) |
| C08K 5/548 | (2006.01) |
| C08K 13/02 | (2006.01) |
| C08K 3/04 | (2006.01) |
| B60C 1/00 | (2006.01) |

(52) U.S. Cl.
CPC ............ *C08K 13/02* (2013.01); *B60C 1/0016* (2013.04); *C08K 3/04* (2013.01); *C08K 3/36* (2013.01); *C08K 5/098* (2013.01); *C08K 5/548* (2013.01); *C08K 5/5415* (2013.01)

(58) Field of Classification Search
None
See application file for complete search history.

(56) References Cited

U.S. PATENT DOCUMENTS

| | | |
|---|---|---|
| 2,447,064 A | 8/1948 | Gebhart et al. |
| 2,599,553 A | 6/1952 | Hotten |
| 2,768,996 A | 10/1956 | Bulloff |
| 3,018,291 A | 1/1962 | Andersen et al. |
| 3,024,237 A | 3/1962 | Drummond et al. |
| 3,172,892 A | 3/1965 | Le Suer et al. |
| 3,219,666 A | 11/1965 | Norman et al. |
| 3,223,495 A | 12/1965 | Calvino et al. |
| 3,272,746 A | 9/1966 | Le Suer et al. |
| 3,361,673 A | 1/1968 | Stuart et al. |
| 3,367,864 A | 2/1968 | Elliott et al. |
| 3,443,918 A | 5/1969 | Kautsky et al. |
| 3,461,108 A | 8/1969 | Heilman et al. |
| 3,560,455 A | 2/1971 | Hazen et al. |
| 3,560,456 A | 2/1971 | Hazen et al. |
| 3,560,457 A | 2/1971 | Hazen et al. |
| 3,580,893 A | 5/1971 | Heilman |
| 3,706,704 A | 12/1972 | Heilman |
| 3,729,450 A | 4/1973 | Galiano et al. |
| 3,729,451 A | 4/1973 | Blecke et al. |
| 3,738,948 A | 6/1973 | Dunnom |
| 3,836,511 A | 9/1974 | O'Farrell et al. |
| 3,912,764 A | 10/1975 | Palmer, Jr. |
| 3,944,552 A | 3/1976 | Lawrence |
| 3,990,978 A | 11/1976 | Hill |
| 4,003,393 A | 1/1977 | Jaggard et al. |
| 4,007,128 A | 2/1977 | Poklacki |
| 4,016,931 A | 4/1977 | Cryar, Jr. |

(Continued)

FOREIGN PATENT DOCUMENTS

| | | |
|---|---|---|
| EP | 0355895 A2 | 2/1990 |
| EP | 0535642 A1 | 4/1993 |

(Continued)

OTHER PUBLICATIONS

Si 69 TDS, Evonik Industries, printed Jun. 26, 2016.*
Calcium stearate, TDS, Sigma-Aldrich, printed Jun. 26, 2016.*
Brinke, J.W. Ten, et al., "The Influence of Silane Sulfur and Carbon Rank on Processing of a Silica Reinforced Tire Tread Compound," Rubber Chemistry and Technology, vol. 76, p. 12+, 2003.
Ladouce-Stelandre, L., et al., "Dynamic Mechanical Properties of Precipitated Silica Filled Rubber: Influence of Morphology and Coupling Agent," Rubber Chemistry and Technology, vol. 76, p. 145+, 2003.

(Continued)

*Primary Examiner* — Peter A Salamon
(74) *Attorney, Agent, or Firm* — Meredith E. Hooker; Jenny L. Sheaffer

(57) ABSTRACT

The present disclosure provides reinforcing filler-containing rubber compositions suitable for use in tires, and particularly in tire treads. These rubber compositions comprise a metal carboxylate. The metal carboxylate provides improved processability to the rubber compositions in the form of a reduced Mooney viscosity. In certain exemplary embodiments, these rubber compositions containing the metal carboxylate also have an enhanced elastic modulus (also referred to as the G'). Further, in certain of the enhanced elastic modulus embodiments, the rubber compositions containing the metal carboxylate also have decreased hysteresis loss.

21 Claims, No Drawings

(56) References Cited

U.S. PATENT DOCUMENTS

| | | |
|---|---|---|
| 4,031,014 A | 6/1977 | Griffin, Jr. |
| 4,038,207 A | 7/1977 | Poklacki et al. |
| 4,046,524 A | 9/1977 | van Hesden |
| 4,078,609 A | 3/1978 | Pavlich |
| 4,094,795 A | 6/1978 | DeMartino et al. |
| 4,104,173 A | 8/1978 | Gay et al. |
| 4,115,285 A | 9/1978 | van Hesden |
| 4,137,400 A | 1/1979 | DeMartino et al. |
| 4,143,007 A | 3/1979 | DeMartino |
| 4,143,715 A | 3/1979 | Pavlich |
| 4,152,289 A | 5/1979 | Griffin, Jr. |
| 4,152,499 A | 5/1979 | Boerzel et al. |
| 4,153,066 A | 5/1979 | Griffin, Jr. |
| 4,153,649 A | 5/1979 | Griffin, Jr. |
| 4,169,798 A | 10/1979 | DeMartino |
| 4,169,818 A | 10/1979 | DeMartino |
| 4,172,055 A | 10/1979 | Griffin, Jr. |
| 4,174,283 A | 11/1979 | Griffin, Jr. |
| 4,200,539 A | 4/1980 | Burnham |
| 4,200,540 A | 4/1980 | Burhham |
| 4,234,435 A | 11/1980 | Meinhardt et al. |
| 4,301,025 A | 11/1981 | Brady et al. |
| 4,316,810 A | 2/1982 | Burnham |
| 4,322,336 A | 3/1982 | MacHurat et al. |
| 4,410,437 A | 10/1983 | Erdman |
| 4,446,281 A | 5/1984 | Takamatsu et al. |
| 4,450,254 A | 5/1984 | Isley et al. |
| 4,473,408 A | 9/1984 | Purinton, Jr. |
| 4,507,213 A | 3/1985 | Daccord et al. |
| 4,537,700 A | 8/1985 | Purinton, Jr. |
| 4,595,513 A | 6/1986 | Morgenthaler et al. |
| 4,622,155 A | 11/1986 | Harris et al. |
| 4,781,845 A | 11/1988 | Syrinek et al. |
| 4,787,994 A | 11/1988 | Thorne et al. |
| 4,791,140 A | 12/1988 | Fukasawa et al. |
| 4,795,574 A | 1/1989 | Syrinek et al. |
| 4,860,821 A | 8/1989 | Hagewood |
| 4,877,894 A | 10/1989 | Huddleston |
| 4,880,444 A | 11/1989 | Savins et al. |
| 4,910,267 A | 3/1990 | Oyama et al. |
| 4,975,497 A | 12/1990 | Tate et al. |
| 5,034,139 A | 7/1991 | Reid et al. |
| 5,057,233 A | 10/1991 | Huddleston |
| 5,110,485 A | 5/1992 | Huddleston |
| 5,112,507 A | 5/1992 | Harrison |
| 5,137,978 A | 8/1992 | Degonia et al. |
| 5,137,980 A | 8/1992 | Degonia et al. |
| 5,150,754 A | 9/1992 | Phelps et al. |
| 5,175,225 A | 12/1992 | Ruhe, Jr. |
| 5,190,675 A | 3/1993 | Gross |
| 5,202,035 A | 4/1993 | Huddleston |
| 5,271,464 A | 12/1993 | McCabe |
| 5,281,023 A | 1/1994 | Cedillo et al. |
| 5,286,799 A | 2/1994 | Harrison et al. |
| 5,319,030 A | 6/1994 | Harrison et al. |
| 5,393,309 A | 2/1995 | Cherpeck |
| 5,441,340 A | 8/1995 | Cedillo et al. |
| 5,514,645 A | 5/1996 | McCabe et al. |
| 5,523,417 A | 6/1996 | Blackborrow et al. |
| 5,565,528 A | 10/1996 | Harrison et al. |
| 5,590,958 A | 1/1997 | Dearing, Sr. et al. |
| 5,616,668 A | 4/1997 | Harrison et al. |
| 5,624,182 A | 4/1997 | Dearing, Sr. et al. |
| 5,625,004 A | 4/1997 | Harrison et al. |
| 5,777,025 A | 7/1998 | Spencer et al. |
| 5,792,729 A | 8/1998 | Harrison et al. |
| 5,854,327 A | 12/1998 | Davis et al. |
| 5,916,961 A | 6/1999 | Hergenrother et al. |
| 5,922,792 A | 7/1999 | Wideman et al. |
| 5,972,852 A | 10/1999 | Robson |
| 5,972,853 A | 10/1999 | Boffa et al. |
| 5,981,662 A | 11/1999 | D'Sidocky et al. |
| 5,990,053 A | 11/1999 | Jones et al. |
| 6,004,908 A | 12/1999 | Graham et al. |
| 6,013,703 A * | 1/2000 | Kuhn ................ C08K 5/07 524/100 |
| 6,054,417 A | 4/2000 | Graham et al. |
| 6,133,354 A | 10/2000 | Wang et al. |
| 6,174,989 B1 | 1/2001 | D'Sidocky et al. |
| 6,204,354 B1 | 3/2001 | Wang et al. |
| 6,207,763 B1 | 3/2001 | Wang et al. |
| 6,261,998 B1 | 7/2001 | Amin et al. |
| 6,262,130 B1 | 7/2001 | Derian et al. |
| 6,271,409 B1 | 8/2001 | Geib |
| 6,297,201 B1 | 10/2001 | Geib |
| 6,300,288 B1 | 10/2001 | Schart et al. |
| 6,302,209 B1 | 10/2001 | Thompson, Sr. et al. |
| 6,342,468 B1 | 1/2002 | Geib |
| 6,350,800 B1 | 2/2002 | Wang et al. |
| 6,353,054 B1 | 3/2002 | Wang et al. |
| 6,359,064 B1 | 3/2002 | Wang et al. |
| 6,369,166 B1 | 4/2002 | Wang et al. |
| 6,372,855 B1 * | 4/2002 | Chino ................ C08F 8/00 525/327.4 |
| 6,384,134 B1 | 5/2002 | Hall et al. |
| 6,401,776 B1 | 6/2002 | Wang et al. |
| 6,403,724 B1 | 6/2002 | Wang |
| 6,417,259 B1 | 7/2002 | Wang et al. |
| 6,458,881 B1 | 10/2002 | Pan et al. |
| 6,602,828 B1 | 8/2003 | Amin et al. |
| 6,632,781 B2 | 10/2003 | Harrison et al. |
| 6,699,813 B2 | 3/2004 | Luo et al. |
| 6,706,823 B2 | 3/2004 | Wang et al. |
| 6,719,053 B2 | 4/2004 | Thompson |
| 6,849,581 B1 | 2/2005 | Thompson et al. |
| 6,994,134 B2 | 2/2006 | Grah |
| 7,066,225 B2 | 6/2006 | Rhyne et al. |
| 7,314,850 B2 | 1/2008 | Taylor et al. |
| 7,328,744 B2 | 2/2008 | Taylor et al. |
| 7,368,506 B2 | 5/2008 | Kanenari |
| 7,429,393 B2 | 9/2008 | Wang et al. |
| 7,521,400 B2 | 4/2009 | Samuel |
| 7,534,745 B2 | 5/2009 | Taylor et al. |
| 7,544,731 B2 | 6/2009 | Nakazono et al. |
| 7,700,673 B2 | 4/2010 | Wang et al. |
| 7,770,621 B2 | 8/2010 | Tracey et al. |
| 7,772,308 B2 | 8/2010 | Tracey et al. |
| 7,836,928 B2 | 11/2010 | Hogan et al. |
| 7,934,528 B2 | 5/2011 | Amaddeo et al. |
| 8,389,609 B2 | 3/2013 | Wang et al. |
| 8,546,464 B2 | 10/2013 | Wang et al. |
| 9,090,127 B2 | 7/2015 | Wang |
| 2002/0022085 A1 | 2/2002 | Thise et al. |
| 2002/0188064 A1 | 12/2002 | Wang et al. |
| 2003/0045621 A1 * | 3/2003 | Aramaki ................ C08K 3/32 524/394 |
| 2003/0130398 A1 | 7/2003 | Wang |
| 2003/0130401 A1 | 7/2003 | Lin et al. |
| 2004/0031550 A1 * | 2/2004 | Kanenari ............ B60C 1/0008 152/516 |
| 2004/0132912 A1 | 7/2004 | McElwee |
| 2004/0144464 A1 | 7/2004 | Rhyne et al. |
| 2004/0176514 A1 * | 9/2004 | Kubo ................ C08K 3/0008 524/431 |
| 2005/0022915 A1 | 2/2005 | Bowen, III et al. |
| 2005/0239946 A1 | 10/2005 | Lin et al. |
| 2006/0106143 A1 | 5/2006 | Lin et al. |
| 2006/0111504 A1 | 5/2006 | Morioka et al. |
| 2006/0223945 A1 | 10/2006 | Hollingshurst et al. |
| 2007/0015853 A1 | 1/2007 | Weng et al. |
| 2007/0149689 A1 | 6/2007 | Wang et al. |
| 2007/0208122 A1 | 9/2007 | Bhandarkar et al. |
| 2008/0153972 A1 | 6/2008 | Wang et al. |
| 2008/0306199 A1 | 12/2008 | Minagawa |
| 2009/0068255 A1 * | 3/2009 | Yu ................ A61K 8/0212 424/450 |
| 2009/0104389 A1 * | 4/2009 | Gardi ................ C08F 8/44 428/35.2 |
| 2009/0199945 A1 | 8/2009 | Galimberti et al. |
| 2009/0206511 A1 | 8/2009 | DePaiva et al. |
| 2009/0215966 A1 | 8/2009 | Henning et al. |

(56) References Cited

U.S. PATENT DOCUMENTS

| | | | | |
|---|---|---|---|---|
| 2009/0218024 | A1* | 9/2009 | Tsou | B32B 25/04 152/450 |
| 2009/0227723 | A1* | 9/2009 | Kaya | C08J 5/042 524/495 |
| 2009/0239976 | A1* | 9/2009 | Gardi | C08L 23/04 523/351 |
| 2010/0004368 | A1* | 1/2010 | Wang | B60C 1/0016 524/398 |
| 2011/0009547 | A1 | 1/2011 | Araujo Da Silva et al. | |
| 2011/0028246 | A1* | 2/2011 | Kimura | A63B 37/0003 473/383 |
| 2011/0039994 | A1* | 2/2011 | Wang | B60C 1/00 524/130 |
| 2011/0098378 | A1* | 4/2011 | Wang | B60C 1/0016 523/156 |
| 2011/0294936 | A1* | 12/2011 | Sato | B60C 1/0016 524/315 |
| 2012/0247630 | A1 | 10/2012 | Moreland | |
| 2013/0012651 | A1* | 1/2013 | Sasajima | B60C 1/00 524/575 |
| 2015/0274939 | A1* | 10/2015 | Chen | C08K 5/5415 523/156 |

FOREIGN PATENT DOCUMENTS

| | | |
|---|---|---|
| EP | 0542380 A1 | 5/1993 |
| EP | 0570159 A1 | 11/1993 |
| EP | 0602863 A1 | 6/1994 |
| EP | 0864606 A1 | 9/1998 |
| EP | 1270657 A1 | 1/2003 |
| EP | 1526002 B1 | 7/2004 |
| EP | 1803771 A1 | 7/2007 |
| EP | 1860136 A1 | 11/2007 |
| EP | 2128186 A1 | 12/2009 |
| GB | 695113 | 8/1953 |
| JP | H-044241 A | 1/1992 |
| JP | H05311008 A | 11/1993 |
| JP | 2001026672 A * | 1/2001 |
| JP | 2001040140 A | 2/2001 |
| JP | 4473429 B2 | 5/2001 |
| JP | 2001192506 A1 | 7/2001 |
| JP | 2004027028 A | 1/2004 |
| JP | 2004175134 A | 6/2004 |
| JP | 2006063094 A | 3/2006 |
| JP | 2007138101 A | 6/2007 |
| JP | 2007161792 A | 6/2007 |
| JP | 2007321040 A | 12/2007 |
| JP | 2007321126 A | 12/2007 |
| JP | 2008120936 A | 5/2008 |
| JP | 2009242538 A | 10/2009 |
| JP | 2009249442 A | 10/2009 |
| JP | 2009286989 A | 12/2009 |
| JP | 2009292309 A | 12/2009 |
| JP | 4482210 B2 | 6/2010 |
| JP | 2010248338 A | 11/2010 |
| JP | 2010280782 A | 12/2010 |
| JP | 2011178849 A | 9/2011 |
| WO | 9008170 A1 | 7/1990 |
| WO | 02096677 A1 | 12/2002 |
| WO | 20040588874 A1 | 7/2004 |
| WO | 2007070063 A1 | 6/2007 |
| WO | 2009062733 A1 | 5/2009 |
| WO | 2010016946 A2 | 2/2010 |
| WO | 2011075121 A1 | 6/2011 |
| WO | 2011082157 A1 | 7/2011 |
| WO | 2011158509 A1 | 12/2011 |

OTHER PUBLICATIONS

Suzuki, Toshio, "Preparation of Poly(dimethylsiloxane) Macromonomers by the Initiator Method," Polymer, vol. 30, p. 333-37, 1989.

Hofler, ThomasInternational Search Report with Written Opinion from PCT/US2013/068296, 11 pp. (Mar. 3, 2014).

Wang, Xiaorong et al., "Gelling nature of aluminum soaps in oils," Journal of Colloid and Interface Science, vol. 331, Issue 2, pp. 335-342 (Mar. 15, 2009).

Harple, et al., "Infrared absorption spectra of aluminum soaps," Analytical Chemistry, vol. 24, No. 4, 1952, pp. 635+.

Bauer, Walter H. et al., "Flow properties and structure of peptized aluminum soap-hydrocarbon gels," J. Phy. Chem. vol. 62, pp. 106-110, Jan. 1958.

Bauer, Walter H. et al., "Entrance effects in capillary flow of aluminum dilaurate-toluene gels," J. Phy Chem. vol. 62, pp. 1245-1247, Oct. 1958.

Ludke, Willard O., et al., "Mechanism of peptization of aluminum soaps," J. Phy. Chem. vol. 59, pp. 222-225, Mar. 1955.

McGee, Charles G., "Aluminum monolaurate and proposed structures for aluminum soaps," Am. Chem. Soc., vol. 71, pp. 278-282, Jan. 1949.

Mysels, Karol J., "Studies of aluminum soaps: IX. Electron microscope view of lyophilized aluminum laurate," J. General Physiology, pp. 159-161, Jul. 15, 1964.

Weber, Neill, et al., "Flow properties of aluminum dilaurate-toluene gels," J. Phys. Chem., vol. 60, pp. 270-273, Mar. 1956.

Trappe, V. et al., "Scaling of the viscoelasticity of weakly attractive particles," Physical Review Letters, vol. 85, No. 2, pp. 449-452, Jul. 10, 2000.

Mohajer, Y., et al., "New polyisobutylene-based model elastomeric ionomers. VI. The effect of excess neutralizing agents on solid-state mechanical properties," Applied Polymer Science, vol. 29, No. 6, pp. 1943-1950, 1984.

Kim, Gye Sook, International Search Report from PCT/US2009/048834, 4 pages, Feb. 2, 2010.

Schmitt, Johannes, extended European search report from European patent application No. 08254196.2, 7 pages, Jun. 2, 2009.

Database WPI Week 1999001, Thomson Scientific, London, GB, AN 1990-004108, 1 page.

Ow, Say Kyoun, "Investigation of the role of sulfate ions in the reaction between tetrahydroabietic acid monolayers and aluminum ions," The Institute of Paper Chemistry, Doctor's Dissertation, pp. 1-156, Jun. 1974.

Wang, Xiaorong, et al., "Gelling nature of aluminum soaps in oils," Journal of Colloid and Interface Science, pp. 331 and 335-339, Nov. 2008.

Funkhouser, Gary P. et al., "Rheological comparison of organogelators based on iron and aluminum complexes of dodecylmethylphosphinic acid and methyl dodecanephosphonic acid," Langmuir, vol. 25, issue 15, pp. 8672-8677, 2009.

George, Matthew, et al., "Organogels with complexes of ions and phosphorous-containing amphiphiles as gelators, spontangeous gelation by in situ complexation," Langmuir, vol. 24, pp. 3537-3544, 2008.

Mettler, Rolf-Martin, extended European search report from European patent application 06256456.2, 6 pages, Apr. 10, 2007.

Gaskins, Frederick H., et al., "Rheology of aluminum dilaurate in toluene," Transactions of the Society of Rheology, vol. 13, No. 1, pp. 17-38, 1969.

Nora, Angelo et al., "Metallic soaps," internet article, XP-002524032, pp. 1-16, Sep. 15, 2001.

* cited by examiner

RUBBER COMPOSITIONS COMPRISING METAL CARBOXYLATES AND PROCESSES FOR MAKING THE SAME

CROSS-REFERENCE TO RELATED APPLICATIONS

This application claims priority to U.S. provisional application Ser. No. 61/722,002, filed Nov. 2, 2013, which is hereby incorporated by reference in its entirety.

FIELD OF THE DISCLOSURE

The present disclosure relates to using metal carboxylates to reduce the Mooney viscosity of rubber compositions containing a reinforcing filler. This disclosure also relates to using the metal carboxylates to enhance the elastic modulus of such rubber compositions, and in particular embodiments, to decrease the hysteresis loss of such rubber compositions.

BACKGROUND

It is typical for rubber compositions used in tires to contain a reinforcing filler, such as silica or carbon black. While reinforcing fillers may provide desirable properties to the rubber compositions (e.g., improved elasticity, strength, reduced rolling resistance, etc.), such fillers generally increase the Mooney viscosity, thereby making it more difficult to process the rubber composition.

SUMMARY

The present disclosure provides reinforcing filler-containing rubber compositions suitable for use in tires, and particularly in tire treads. These rubber compositions comprise a metal carboxylate. The metal carboxylate provides improved processability to the rubber compositions in the form of a reduced Mooney viscosity. In certain exemplary embodiments, these rubber compositions containing the metal carboxylate have a reduced Mooney viscosity and an enhanced elastic modulus. Further, in certain exemplary embodiments, the rubber compositions containing the metal carboxylate have a reduced Mooney viscosity, an enhanced elastic modulus and decreased hysteresis loss.

The present disclosure provides vulcanizable rubber compositions comprising: (a) a conjugated diene polymer or copolymer component; (b) a reinforcing filler component comprising at least one of: (i) carbon black, (ii) silica and a silane coupling agent, and (iii) silica; and (c) from 0.5 to 40 phr of at least one metal carboxylate represented by formula (I):

$$(RCOO)_p M^{(p+n)+}(OH)_n,\qquad(I)$$

wherein: R is a hydrocarbyl group having from 1 to 25 carbon atoms and optionally containing a heteroatom selected from a halogen atom, nitrogen, oxygen, and sulfur, M is selected from the group consisting of aluminum, barium, cadmium, calcium, cobalt, iron, lithium, magnesium, sodium, tin, zinc, and zirconium, and p+n equals the valency of M, and each of n and p are independently selected from an integer ranging from 0 to (p+n).

The present disclosure also provides processes for preparing vulcanizable rubber compositions having the foregoing composition. Such processes comprise: (1) mixing a master-batch comprising (a) the conjugated diene polymer or copolymer component; (b) the reinforcing filler component; and (c) the at least one metal carboxylate; (2) mixing a final batch comprising (a) the curative component, and (b) the master-batch; and (3) vulcanizing the final batch.

DETAILED DESCRIPTION

Disclosed herein are reinforcing filler-containing rubber compositions suitable for use in tires, and particularly in the tread portion of tires. These rubber compositions comprise a metal carboxylate. The metal carboxylate provides improved processability to the rubber compositions in the form of a reduced Mooney viscosity. In certain exemplary embodiments, these rubber compositions containing the metal carboxylate have a reduced Mooney viscosity and an enhanced elastic modulus (also referred to as the G'). Further, in certain exemplary embodiments, the rubber compositions containing the metal carboxylate have a reduced Mooney viscosity, an enhanced elastic modulus, and decreased hysteresis loss.

The rubber compositions disclosed herein comprise (a) a conjugated diene polymer or copolymer component; (b) a reinforcing filler component comprising at least one of: (i) carbon black, (ii) silica and a silane coupling agent, and (iii) silica; and (c) from 0.5 to 40 parts by weight per hundred parts of rubber (phr) of at least one metal carboxylate represented by formula (I) below:

$$(RCOO)_p M^{(p+n)+}(OH)_n,\qquad(I)$$

where R is a hydrocarbyl group having from 1 to 25 carbon atoms and optionally containing a heteroatom selected from a halogen atom, nitrogen, oxygen, and sulfur; where M is selected from the group consisting of aluminum, barium, cadmium, calcium, cobalt, iron, lithium, magnesium, sodium, tin, zinc, and zirconium; and where p+n equals the valency of M, and each of n and p are independently selected from an integer ranging from 0 to (p+n). For example, where M is $Al^{3+}$, each of p and n are independently selected from 0, 1, 2, and 3. More specifically, M will range from 1-4. For the avoidance of doubt, the second "+" in the expression $M^{(p+n)+}$ is meant to indicate that the valency of the metal is positive.

The present disclosure also provides processes for preparing vulcanizable rubber compositions having the foregoing composition. Such processes comprise: (1) mixing a master-batch comprising (a) the conjugated diene polymer or copolymer component; (b) the reinforcing filler component; and (c) the at least one metal carboxylate; (2) mixing a final batch comprising (a) the curative component, and (b) the master-batch; and (3) vulcanizing the final batch.

M of formula (I) has the definition as provided above. In certain exemplary embodiments, M is aluminum. In other exemplary embodiments, M is aluminum or zinc.

Unless otherwise indicated herein, the term "Mooney viscosity" refers to the compound Mooney viscosity, $M_{1+4}$.

Unless otherwise indicated, the terms "G'," "elastic modulus," and "elastic modulus G'" are used interchangeably herein.

In accordance with certain exemplary embodiments disclosed herein, the rubber compositions are unvulcanized. In accordance with other embodiments, the rubber compositions are vulcanized.

As mentioned above, the rubber compositions disclosed herein can be produced by various processes, including but not limited to the process explicitly disclosed. As discussed, the amount of metal carboxylate used in the rubber compositions and in certain exemplary embodiments of the processes is from 0.5 to 40 phr of at least one metal carboxylate represented by formula (I). (Explanations provided herein with respect to the amounts of metal carboxylates and other aspects of the presence disclosure should be understood to apply equally to the rubber compositions and to the processes disclosed herein, unless otherwise stated or otherwise made clear from the context.) In certain exemplary embodiments, the rubber compositions include only one metal carboxylate; in other embodiments, the rubber compositions include two, three or more different metal carboxylates. In certain exemplary embodiments, the rubber compositions include from 0.5 to 20 phr of the at least one metal carboxylate, including from 0.5 to 5 phr, including from 2 to 20 phr, including from 5 to 15 phr, including from 4 to 20 phr, and including from 2 to 5 phr of the at least one metal carboxylate. In certain of the preceding embodiments, the rubber compositions include from 2 to 40 phr of the at least one metal carboxylate, including from 5 to 40 phr, including from 10 to 40 phr, and including from 20 to 40 phr of the at least one metal carboxylate.

With respect to formula (I), in certain exemplary embodiments, R contains from 4 to 20 carbon atoms, including from 16-20 carbon atoms. Additionally, in certain exemplary embodiments, the metal M is selected from aluminum, barium, calcium, lithium, magnesium, sodium, and zinc. In certain of the preceding embodiments, M is selected from aluminum and zinc, and in other embodiments, M is aluminum. When M is aluminum, suitable types of carboxylates include, but are not limited to, aluminum tricarboxylates, dihydroxyaluminum carboxylates, and hydroxyaluminum dicarboxylates.

Non-limiting specific examples of metal carboxylates represented by formula (I) that are suitable for use in the rubber compositions and in the processes disclosed herein include dihydroxyaluminum stearate, hydroxyaluminum distearate, aluminum tristearate, aluminum tri(n-decanoate), hydroxyaluminum di(2-ethylhexanoate), aluminum tri(n-octanoate), aluminum tri(5-phenylbutanoate), aluminum trilinoleate, zinc distearate, barium distearate, calcium distearate, magnesium distearate, sodium monostearate, lithium monostearate, combinations thereof, and the like.

In certain exemplary embodiments, when M is aluminum, the metal carboxylates include dihydroxyaluminum stearate, hydroxyaluminum distearate, aluminum tristearate, aluminum tri(n-decanoate), hydroxyaluminum di(2-ethylhexanoate), aluminum tri(n-octanoate), aluminum tri(5-phenylbutanoate), aluminum trilinoleate, combinations thereof, and the like.

With respect to the optional halogen heteroatom in the metal carboxylate, examples of suitable halogen atoms include, but are not limited to fluorine, chlorine, bromine, iodine, and the like.

The rubber compositions disclosed herein and the processes disclosed herein contain/make use of a reinforcing filler component. The reinforcing filler component includes at least one of (i) carbon black, (ii) silica and a silane coupling agent, and (iii) silica. In other words, with respect to (ii) and (iii), the reinforcing filler component can include silica with or without a silane coupling agent present. Overall, each of (i) carbon black, (ii) silica and a silane coupling agent, and (iii) silica, or combinations thereof, may comprise all or part of the reinforcing filler component. Preferably, when silica is present in the reinforcing filler component, a silane coupling agent is also present. In accordance with certain exemplary embodiments, when M of formula (I) is aluminum (i.e., the metal carboxylate is an aluminum carboxylate), a preferred reinforcing filler component includes at least one of (i) carbon black and (ii) silica and a silane coupling agent. In accordance with other embodiments, when M of formula (I) is zinc (i.e., the metal carboxylate is a zinc carboxylate), a preferred reinforcing filler component includes (i) carbon black.

In certain exemplary embodiments, the rubber compositions disclosed herein comprise and the processes make use of from 5 to 200 phr of the reinforcing filler component, including from 10 to 130 phr, including from 40 to 100 phr, including from 40 to 80 phr, and including from 50 to 70 phr of the reinforcing filler component.

Examples of suitable types carbon blacks used as all or part of the reinforcing filler component in the rubber compositions and processes disclosed herein include, but are not limited to, furnace blacks, channel blacks, and lamp blacks. Such carbon blacks can include any of the commonly available, commercially-produced carbon blacks. Those carbon blacks having a surface area (EMSA) of at least 20 $m^2/g$ and, more preferably, at least 35 $m^2/g$ up to 200 $m^2/g$ or higher are preferred. Surface area values used in this disclosure are determined by ASTM D-1765 using the cetyltrimethyl-ammonium bromide (CTAB) technique. Specific non-limiting examples of suitable carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks, and conducting channel blacks. Other examples of suitable carbon blacks include, but are not limited to, acetylene blacks. Furthermore, a mixture of two or more of the aforementioned carbon blacks can be used as the filler in certain exemplary embodiments of the rubber compositions disclosed herein. The grades of the carbon blacks suitable for use in certain exemplary embodiments of the rubber compositions disclosed herein are those characterized by ASTM D-1765, such as N-110, N-220, N-339, N-330, N-351, N-550, N-660, and N990 grades. The carbon blacks can be in a pelletized form or an unpelletized flocculent mass. For more uniform mixing, unpelletized carbon black is preferred. In accordance with certain exemplary embodiments, the reinforcing filler component comprises from 5 to 200 phr of carbon black, including from 40 to 100 phr, including from 40 to 80 phr, and including from 50 to 70 phr of carbon black. 4. In certain exemplary embodiments, the rubber composition comprises no more than 10 phr of carbon black.

Examples of suitable silica used as all or part of the reinforcing filler component of the rubber compositions and processes disclosed herein include, but are not limited to, precipitated amorphous silicas, wet silicas (hydrated silicic acid), dry silicas such as fumed silica, calcium silicate, and the like. Other suitable fillers include aluminum silicate, magnesium silicate, and the like. The surface area, as measured by the BET method gives the best measure of the reinforcing character of different silica fillers. In certain exemplary embodiments, the surface area of the silica filler is about 32 $m^2/g$ to about 400 $m^2/g$, with the range of about 100 $m^2/g$ to about 250 $m^2/g$ being preferred, and the range of about 150 $m^2/g$ to about 220 $m^2/g$ being most preferred. The pH of the silica filler is generally about 5.5 to about 7 or slightly over, preferably about 5.5 to about 6.8 (such pH as can be determined on a solution of silica according to ASTM D6379-11 Standard Test Method for Silica—pH value). In accordance with certain exemplary embodiments, the reinforcing filler component comprises from 5 to 200 phr of silica, including from 10 to 130 phr, and including from 40 to 80 phr of silica.

As mentioned above, in certain exemplary embodiments disclosed herein, when silica is used as all or part of the reinforcing filler component of the rubber compositions disclosed herein, a silane coupling agent may be used. In accordance with certain exemplary embodiments, the silane coupling agent is present in an amount from 0.01 to 40% by weight of the silica, including from 0.01 to 30%, including from 0.01 to 25% by weight of the silica. In certain exemplary embodiments, the silane coupling agent is present in an amount of no more than 1 phr.

Generally speaking, any conventional type of silane coupling agent, can be used, such as those having a silane and a constituent component or moiety that can react with a polymer, particularly a vulcanizable polymer. The silane coupling agent acts as a connecting bridge between silica and the polymer. Suitable silane coupling agents include those containing groups such as mercapto, blocked mercapto, polysulfide, amino, vinyl, epoxy, and combinations thereof.

Examples of suitable types of silane coupling agents for use in certain exemplary embodiments disclosed herein include, but are not limited to, alkyl alkoxysilanes (including bis(trialkoxysilylorgano polysulfides), blocked mercaptosilanes, and mercaptosilanes. Alkyl alkoxysilanes have the general formula $R^6pSi(OR^2)_{4-p}$ where each $R^2$ is independently a monovalent organic group, and p is an integer from 1 to 3, with the proviso that at least one $R^6$ is an alkyl group. Preferably p is 1. Generally, each $R^6$ independently comprises $C_1$ to $C_{20}$ aliphatic, $C_5$ to $C_{20}$ cycloaliphatic, $C_6$ to $C_{20}$ aromatic; each $R^2$ independently comprises $C_1$ to $C_6$ aliphatic. In certain exemplary embodiments, each $R^6$ independently comprises $C_6$ to $C_{15}$ aliphatic and in additional embodiments each $R^6$ independently comprises $C_8$ to $C_{14}$ aliphatic. Mercaptosilanes have the general formula $HS—R^3—Si(R^4)(R^5)(R^5)$ where $R^3$ is a divalent organic group, $R^4$ is a halogen atom or an alkoxy group, each $R^5$ is independently a halogen, an alkoxy group or a monovalent organic group. The halogen is chlorine, bromine, fluorine, or iodine. The alkoxy group preferably has 1-3 carbon atoms. Blocked mercaptosilanes have the general formula $B—S—R^7—Si—X_3$ with an available silyl group for reaction with silica in a silica-silane reaction and a blocking group B that replaces the mercapto hydrogen atom to block the reaction of the sulfur atom with the polymer. In the foregoing general formula, B is a block group which can be in the form of an unsaturated heteroatom or carbon bound directly to sulfur via a single bond; $R^7$ is $C_1$ to $C_6$ linear or branched alkylidene and each X is independently selected from the group consisting of $C_1$ to $C_4$ alkyl or $C_1$ to $C_4$ alkoxy.

Non-limiting examples of alkyl alkoxysilanes suitable for use in certain exemplary embodiments disclosed herein include octyltriethoxysilane, octyltrimethoxysilane, trimethylethoxysilane, cyclohexyltriethoxysilane, isobutyltriethoxy-silane, ethyltrimethoxysilane, cyclohexyl-tributoxysilane, dimethyldiethoxysilane, methyltriethoxysilane, propyltriethoxysilane, hexyltriethoxysilane, heptyltriethoxysilane, nonyltriethoxysilane, decyltriethoxysilane, dodecyltriethoxysilane, tetradecyltriethoxysilane, octadecyltriethoxysilane, methyloctyldiethoxysilane, dimethyldimethoxysilane, methyltri-methoxysilane, propyltrimethoxysilane, hexyltrimethoxysilane, heptyltrimethoxysilane, nonyltrimethoxysilane, decyltrimethoxysilane, dodecyltrimethoxysilane, tetradecyltri-methoxysilane, octadecyl-trimethoxysilane, methyloctyl dimethoxysilane, and mixtures thereof.

In certain exemplary embodiments disclosed herein, the alkyl alkoxysilane is selected from hexyltriethoxysilane, heptyltriethoxysilane, octyltriethoxysilane, nonyltriethoxysilane, decyltriethoxysilane, dodecyltriethoxysilane, tetradecyltriethoxysilane, octadecyltriethoxy-silane, hexyltrimethoxysilane, heptyltrimethoxysilane, octyltrimethoxysilane, nonyltrimethoxysilane, decyltrimethoxysilane, dodecyltrimethoxysilane, tetradecyltrimethoxysilane, octadecyltrimethoxysilane, and mixtures thereof.

Non-limiting examples of bis(trialkoxysilylorgano)polysulfides suitable for use in certain exemplary embodiments disclosed herein include bis(trialkoxysilylorgano) disulfides and bis(trialkoxysilylorgano)tetrasulfides. Specific non-limiting examples of bis(trialkoxysilylorgano)disulfides suitable for use in certain exemplary embodiments disclosed herein include 3,3'-bis(triethoxysilylpropyl) disulfide, 3,3'-bis(trimethoxysilylpropyl)disulfide, 3,3'-bis(tributoxysilylpropyl)disulfide, 3,3'-bis(tri-t-butoxysilylpropyl)disulfide, 3,3'-bis(trihexoxysilylpropyl)disulfide, 2,2'-bis(dimethylmethoxysilylethyl)disulfide, 3,3'-bis(diphenylcyclohexoxysilylpropyl)disulfide, 3,3'-bis(ethyl-di-sec-butoxysilylpropyl)disulfide, 3,3'-bis(propyldiethoxysilylpropyl)disulfide, 12,12'-bis(triisopropoxysilylpropyl)disulfide, 3,3'-bis(dimethoxyphenylsilyl-2-methylpropyl)disulfide, and mixtures thereof. Non-limiting examples of bis(trialkoxysilylorgano) tetrasulfide silane coupling agents suitable for use in certain exemplary embodiments disclosed herein include bis(3-triethoxysilylpropyl)tetrasulfide, bis(2-triethoxysilylethyl) tetrasufide, bis(3-trimethoxysilylpropyl)tetrasulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilyl-N,N-dimethylthiocarbamoyl tetrasulfide, 3-trimethoxysilylpropyl-benzothiazole tetrasulfide, 3-triethoxysilylpropylbenzothiazole tetrasulfide, and mixtures thereof. Bis(3-triethoxysilylpropyl)tetrasulfide is sold commercially as Si69® by Evonik Degussa Corporation.

Non-limiting examples of mercaptosilanes suitable for use in certain exemplary embodiments disclosed herein include 1-mercaptomethyltriethoxysilane, 2-mercaptoethyltriethoxysilane, 3-mercaptopropyltriethoxysilane, 3-mercaptopropylmethyldiethoxysilane, 2-mercaptoethyltripropoxysilane, 18-mercaptooctadecyldiethoxychlorosilane, and mixtures thereof.

Non-limiting examples of blocked mercaptosilanes suitable for use in certain exemplary embodiments disclosed herein include, but are not limited to, those described in U.S. Pat. Nos. 6,127,468; 6,204,339; 6,528,673; 6,635,700; 6,649,684; 6,683,135; the disclosures of which are hereby incorporated by reference. Representative examples of the silanes for use herein in certain exemplary embodiments disclosed herein include, but are not limited to, 2-triethoxysilyl-1-ethylthioacetate; 2-trimethoxysilyl-1-ethylthioacetate; 2-(methyldimethoxysilyl)-1-ethylthioacetate; 3-trimethoxysilyl-1-propylthioacetate; triethoxysilylmethylthioacetate; trimethoxysilylmethylthioacetate; triisopropoxysilylmethylthioacetate; methyldiethoxysilylmethylthioacetate; methyldimethoxysilylmethylthioacetate; methyldiisopropoxysilylmethylthioacetate; dimethylethoxysilylmethylthioacetate; dimethylmethoxysilylmethylthioacetate; dimethylisopropoxysilylmethylthioacetate; 2-triisopropoxysilyl-1-ethylthioacetate; 2-(methyldiethoxysilyl)-1-ethylthioacetate, 2-(methyldiisopropoxysilyl)-1-ethylthioacetate; 2-(dimethylethoxysilyl)-1-ethylthioacetate; 2-(dimethylmethoxysilyl)-1-ethylthioacetate; 2-(dimethylisopropoxysilyl)-1-ethylthioacetate; 3-triethoxysilyl-1-propyl-thio acetate;

3-triisopropoxysilyl-1-propylthioacetate; 3-methyldiethoxysilyl-1-propyl-thioacetate; 3-methyldimethoxysilyl-1-propylthioacetate; 3-methyldiisopropoxysilyl-1-propylthioacetate; 1-(2-triethoxysilyl-1-ethyl)-4-thioacetylcyclohexane; 1-(2-triethoxysilyl-1-ethyl)-3-thioacetylcyclohexane; 2-triethoxysilyl-5-thioacetylnorbornene; 2-triethoxysilyl-4-thioacetylnorbornene; 2-(2-triethoxysilyl-1-ethyl)-5-thioacetylnorbornene; 2-(2-triethoxy-silyl-1-ethyl)-4-thioacetylnorbornene; 1-(1-oxo-2-thia-5-triethoxysilylphenyl)benzoic acid; 6-triethoxysilyl-1-hexylthioacetate; 1-triethoxysilyl-5-hexylthioacetate; 8-triethoxysilyl-1-octylthioacetate; 1-triethoxysilyl-7-octylthioacetate; 6-triethoxysilyl-1-hexylthioacetate; 1-triethoxysilyl-5-octylthioacetate; 8-trimethoxysilyl-1-octylthioacetate; 1-trimethoxysilyl-7-octylthioacetate; 10-triethoxysilyl-1-decylthioacetate; 1-triethoxysilyl-9-decylthioacetate; 1-triethoxysilyl-2-butylthioacetate; 1-triethoxysilyl-3-butylthioacetate; 1-triethoxysilyl-3-methyl-2-butylthioacetate; 1-triethoxysilyl-3-methyl-3-butylthioacetate; 3-trimethoxysilyl-1-propylthiooctanoate; 3-triethoxysilyl-1-propyl-1-propylthiopalmitate; 3-triethoxysilyl-1-propylthiooctanoate; 3-triethoxysilyl-1-propylthiobenzoate; 3-triethoxysilyl-1-propylthio-2-ethylhexanoate; 3-methyldiacetoxysilyl-1-propylthioacetate; 3-triacetoxysilyl-1-propylthioacetate; 2-methyldiacetoxysilyl-1-ethylthioacetate; 2-triacetoxysilyl-1-ethylthioacetate; 1-methyldiacetoxysilyl-1-ethylthioacetate; 1-triacetoxysilyl-1-ethylthioacetate; tris-(3-triethoxysilyl-1-propyl)trithiophosphate; bis-(3-triethoxysilyl-1-propyl)methyldithiophosphonate; bis-(3-triethoxysilyl-1-propyl)ethyldithiophosphonate; 3-triethoxysilyl-1-propyldimethylthiophosphinate; 3-triethoxysilyl-1-propyldiethylthio-phosphinate; tris-(3-triethoxysilyl-1-propyl)tetrathiophosphate; bis-(3-triethoxysilyl-1 propyl)methyltrithiophosphonate; bis-(3-triethoxysilyl-1-propyl)ethyltrithiophosphonate; 3-triethoxysilyl-1-propyldimethyldithiophosphinate; 3-triethoxysilyl-1-propyldiethyldithio-phosphinate; tris-(3-methyldimethoxysilyl-1-propyl)trithiophosphate; bis-(3-methyldimethoxysilyl-1-propyl)methyldithiophosphonate; bis-(3-methyldimethoxysilyl-1-propyl)-ethyldithiophosphonate; 3-methyldimethoxysilyl-1-propyldimethylthiophosphinate; 3-methyldimethoxysilyl-1-propyldiethylthiophosphinate; 3-triethoxysilyl-1-propylmethyl-thiosulfate; 3-triethoxysilyl-1-propylmethanethiosulfonate; 3-triethoxysilyl-1-propyl-ethanethiosulfonate; 3-triethoxysilyl-1-propylbenzenethiosulfonate; 3-triethoxysilyl-1-propyltoluenethiosulfonate; 3-triethoxysilyl-1-propylnaphthalenethiosulfonate; 3-triethoxysilyl-1-propylxylenethiosulfonate; triethoxysilylmethylmethylthiosulfate; triethoxysilylmethylmethanethiosulfonate; triethoxysilylmethylethanethiosulfonate; triethoxysilylmethylbenzenethiosulfonate; triethoxysilylmethyltoluenethiosulfonate; triethoxysilylmethylnaphthalenethiosulfonate; triethoxysilylmethylxylenethiosulfonate, and the like. Mixtures of various blocked mercaptosilanes can be used. A further example of a suitable blocked mercaptosilane for use in certain exemplary embodiments is NXT™ silane (3-octanoylthio-1-propyltriethoxysilane), commercially available from Momentive Performance Materials Inc. of Albany, N.Y.

In accordance with certain exemplary embodiments disclosed herein, the reinforcing filler component of the rubber compositions disclosed herein may further comprise at least one of clay, mica, starch, magnesium hydroxide, aluminum hydroxide, zinc oxide, and titanium dioxide. The silane coupling agents disclosed herein may be used in connection with some of the aforementioned optional inorganic fillers.

As discussed above, the rubber compositions and processes include/make use of a conjugated diene polymer or copolymer component. (By stating that the rubber composition includes or the process makes use of a conjugated diene polymer or copolymer component, it should be understood that one or more than one (e.g., two, three, or more) conjugated diene polymers or copolymers may be utilized. In other words, the use of the phrase a conjugated diene polymer or copolymer component should not be understood to be limited to only one such polymer or copolymer.) In accordance with the embodiments disclosed herein, the conjugated diene polymer or copolymer component is present at 100 phr of the rubber composition. In accordance with certain exemplary embodiments disclosed herein, the conjugated diene polymer or copolymer component includes at least one of a conjugated diene polymer or copolymer derived from, for example, the polymerization of one or more of the following conjugated diene monomer units: 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, 1,3-cyclopentanediene, 1,3-cyclohexadiene, 1,3-cycloheptadiene, 1,3-cyclooctadiene, and combinations thereof. In certain exemplary embodiments disclosed herein, suitable conjugated diene polymers and conjugated diene copolymers used in the rubber compositions disclosed herein can be derived from the polymerization of one or more of the conjugated diene monomers disclosed above and one or more vinyl aromatic hydrocarbon monomers. Examples of suitable vinyl aromatic hydrocarbon monomers for use in certain exemplary embodiments include, but are not limited to styrene, α-methylstyrene, p-methylstyrene, o-methylstyrene, p-butylstyrene, vinylnaphthalene, and combinations thereof.

Such conjugated diene polymer or copolymer derived from the aforementioned monomers and suitable for use in certain exemplary embodiments disclosed herein may be prepared and recovered according to various suitable methods such as batch, semi-continuous, or continuous operations. The polymerization can also be carried out in a number of different polymerization reactor systems, including but not limited to bulk polymerization, vapor phase polymerization, solution polymerization, suspension polymerization, coordination polymerization, and emulsion polymerization. The polymerization may be carried out using a free radical mechanism, an anionic mechanism, a cationic mechanism, or a coordination mechanism. All of the above polymerization methods are well known to persons skilled in the art.

Non-limiting examples of conjugated diene polymer or copolymers derived from these monomers and suitable for use in certain exemplary embodiments disclosed herein include polyisoprene, polybutadiene, butadiene-isoprene copolymer, butadiene-isoprene-styrene copolymer, isoprene-styrene copolymer, styrene-butadiene copolymer, butyl rubber, and halogenated butyl rubber.

In accordance with certain exemplary embodiments disclosed herein, the conjugated diene polymer or copolymer component includes at least one of a polyisoprene, polybutadiene, butadiene-isoprene copolymer, butadiene-isoprene-styrene copolymer, isoprene-styrene copolymer, styrene-butadiene copolymer, natural rubber, butyl rubber, and halogenated butyl rubber.

In certain exemplary embodiments disclosed herein, the conjugated diene polymer or copolymer component includes at least one silica-reactive functionalized conjugated diene polymer or copolymer. In certain of these embodiments, the silica-reactive functionalized conjugated diene polymer or copolymer may form all, none, or part of the conjugated diene polymer or copolymer component. In other words, rubber compositions disclosed herein may comprise 0 to 100 phr, including 10 to 90 phr, 20 to 80 phr, and 30 to 70 phr of the silica-reactive functionalized conjugated diene polymer or copolymer. Thus, when the silica-reactive functionalized conjugated diene polymer or copolymer forms part of the conjugated diene polymer or copolymer component, an unmodified, i.e., non-functionalized, conjugated diene polymer or copolymer, according to those conjugated diene polymer or copolymer disclosed herein, is also present in this component.

In accordance with certain exemplary embodiments, silica-reactive functionalized conjugated diene polymer or copolymer includes the silica-reactive functionalized styrene-butadiene copolymer, a silica-reactive functionalized polybutadiene, a silica-reactive functionalized polyisoprene, and the like. Examples of suitable-silica-reactive functional groups present in the silica-reactive functionalized conjugated diene polymer or copolymers include, but are not limited to, a nitrogen-containing functional group, a silicon-containing functional group, an oxygen or sulfur-containing functional group, and a metal-containing functional group. The silica-reactive functionalized polymer or copolymer may have the functional group at the terminal or in the main chain thereof.

Non-limiting examples of suitable nitrogen-containing functional groups for the silica-reactive functionalized conjugated diene polymer or copolymer include, but are not limited to, any of a substituted or unsubstituted amino group, an amide residue, an isocyanate group, an imidazolyl group, an indolyl group, a nitrile group, a pyridyl group, and a ketimine group. The substituted or unsubstituted amino group includes a primary alkylamine, a secondary alkylamine or a cyclic amine, and an amino group derived from a substituted or unsubstituted imine.

Non-limiting examples of suitable silicon-containing functional groups for the silica-reactive functionalized conjugated diene polymer or copolymer include, but are not limited to, an organic silyl or siloxy group, and more precisely, the functional group may be selected from an alkoxysilyl group, an alkylhalosilyl group, a siloxy group, an alkylaminosilyl group, and an alkoxyhalosilyl group. Suitable silicon-containing functional groups also include those disclosed in U.S. Pat. No. 6,369,167, the entire disclosure of which is hereby incorporated by reference.

Non-limiting examples of suitable oxygen or sulfur-containing functional groups for the silica-reactive functionalized conjugated diene polymer or copolymer include, but are not limited to, a hydroxyl group, a carboxyl group, an epoxy group, a glycidoxy group, a diglycidylamino group, a cyclic dithiane-derived functional group, an ester group, an aldehyde group, an alkoxy group, a ketone group, a thiocarboxyl group, a thioepoxy group, a thioglycidoxy group, a thiodiglycidylamino group, a thioester group, a thioaldehyde group, a thioalkoxy group and a thioketone group. The alkoxy group may be an alcohol-derived alkoxy group derived from a benzophenone.

In certain exemplary embodiments disclosed herein, the rubber compositions include other conventional rubber additives. These include, for example, process oils, plasticizers, processing aids, waxes, anti-degradants such as antioxidants and anti-ozonants, tackifying resins, reinforcing resins, fatty acids, peptizers, zinc oxide, and the like. Unless otherwise indicated herein, suitable amounts of such components can be determined by one skilled in the art.

In certain exemplary embodiments disclosed herein, process oils may be added to the formulations to soften the rubber composition. Process oils may also be added to improve the processability by reducing the Mooney viscosity. Non-limiting examples of process oils used in the rubber compositions according to certain exemplary embodiments disclosed herein include paraffinic, naphthenic, aromatic process, and the like. Certain suitable oils, including the aforementioned oils, are low polycyclic aromatic content (low PCA) oils. Low PCA oils include those containing less than 3 wt %, less than 2 wt % or less than 1 wt % of polycyclic aromatic compounds (as measured by IP346). Commercially available low PCA oils include various naphthenic oils, mild extraction solvates (MES) and treated distillate aromatic extracts (TDAE). In accordance with certain exemplary embodiments, the rubber composition comprise 0 to 30 phr of process oils, including from 5 to 20, including from 7 to 12 phr of process oils.

In accordance with certain exemplary embodiments disclosed herein, the metal carboxylates may reduce, eliminate, or replace the use of process oils or other processing aids. As discussed in greater detail below, the metal carboxylates improve the processability of the rubber compositions disclosed herein by reducing the Mooney viscosity, thereby mitigating or offsetting the need to add process oils or other processing aids to reduce the viscosity of such rubber compositions during processing.

In accordance with certain exemplary embodiments disclosed herein, the rubber compositions include a curative component. The curative component includes at least one of a vulcanizing agent; a vulcanizing accelerator; a vulcanizing activator such as zinc oxide, stearic acid, and the like; a vulcanizing inhibitor, and an anti-scorching agent. Vulcanizing inhibitors and anti-scorching agents are known in the art and can be selected by one skilled in the art based on the vulcanizate properties desired. Unless otherwise indicated herein a "vulcanizing agent" refers to the compounds used alone, or as part of a system, to cure, i.e., crosslink, the rubber composition during vulcanization.

Examples of suitable types of vulcanizing agents for use in the rubber compositions and processes according to certain exemplary embodiments, include but are not limited to, sulfur or peroxide-based curing components. Thus, in certain such embodiments, the curative component includes a sulfur-based curative or a peroxide-based curative. Examples of specific suitable sulfur vulcanizing agents for use in certain exemplary embodiments disclosed herein include "rubbermaker's" soluble sulfur; sulfur donating curing agents, such as an amine disulfide, polymeric polysulfide or sulfur olefin adducts; and insoluble polymeric sulfur. Preferably, the sulfur vulcanizing agent is soluble sulfur or a mixture of soluble and insoluble polymeric sulfur. For a general disclosure of suitable vulcanizing agents and other components used in curing, e.g., vulcanizing inhibitor and anti-scorching agents, one can refer to Kirk-Othmer, Encyclopedia of Chemical Technology, 3rd ed., Wiley Interscience, N.Y. 1982, Vol. 20, pp. 365 to 468, particularly Vulcanization Agents and Auxiliary Materials, pp. 390 to 402, or Vulcanization by A. Y. Coran, Encyclopedia of Polymer Science and Engineering, Second Edition (1989 John Wiley & Sons, Inc.), both of which are incorporated herein by reference. Vulcanizing agents can be used alone or in combination. The vulcanizing agents are used in an amount ranging from 0.1 to 10 phr, including from 1 to 7.5 phr, including from 1 to 5 phr, and preferably from 1 to 3.5 phr.

Vulcanizing accelerators are used to control the time and/or temperature required for vulcanization and to improve properties of the vulcanizate. Examples of suitable vulcanizing accelerators used in the rubber compositions according to certain exemplary embodiments disclosed herein include, but are not limited to, thiazole vulcanization accelerators, such as 2-mercaptobenzothiazole, 2,2'-dithiobis(benzothiazole) (MBTS), N-cyclohexyl-2-benzothiazole-sulfenamide (CBS), N-tert-butyl-2-benzothiazole-sulfenamide (TBBS), and the like; guanidine vulcanization accelerators, such as diphenyl guanidine (DPG) and the like; thiuram vulcanizing accelerators; carbamate vulcanizing accelerators; and the like. The amount of the vulcanization accelerator used ranges from 0.1 to 10 phr, preferably 0.5 to 5 phr.

As discussed above, the present disclosure includes processes for preparing rubber compositions. It should specifically be understood that this process may be used to prepare the rubber compositions previously disclosed, and also to prepare rubber composition not necessarily corresponding to any those explicitly disclosed herein. Furthermore, it should be understood that the previously discussed rubber compositions may be prepared using this process or may be prepared by a process not necessarily corresponding to the process. Thus, the following descriptions of the process should be understood as applying to one, but not the only, process by which the previously discussed rubber compositions may be prepared. This process generally entails mixing the ingredients together by methods known in the art, such as, for example, by kneading the ingredients together in a Banbury mixer or on a milled roll. The methods generally include at least one non-productive master-batch mixing stage and a final productive mixing stage. The non-productive master-batch stage is known to those of skill in the art and generally understood to be a mixing stage where no vulcanizing agents or vulcanization accelerators are added. In certain exemplary embodiments, more than one non-productive master-batch mixing stage may be used. The final productive mixing stage is also known to those of skill in the art and generally understood to be the mixing stage where the vulcanizing agents and vulcanization accelerators are added into the rubber composition. As used herein, the term "final batch" refers to the productive mixing stage itself, or to the rubber formulation present in this stage, in which the vulcanizing agents and vulcanization accelerators are added into the rubber composition. As used herein, the term "master-batch" refers to the one or more than one non-productive stage itself (i.e., prior to the final batch/productive stage), or to the formulation that exists in this stage. The term "master-batch" thus includes, but is not limited to, the initial master-batch formulation and/or mixing stage and any subsequent mixing or remill formulation and/or stage.

As will be understood by those having skill in the art of preparing rubber compositions, the temperatures utilized during mixing of the ingredients (e.g., master-batch and final batch) may vary depending upon the ingredients utilized, such as the particular curative system. Various types of mixing may be utilized, including high shear-mixing at a suitable rpm, a non-limiting example of which is 60 rpms. Generally, a master-batch mixing stage(s) is conducted by mixing at a temperature of about 80° C. to about 200° C. In accordance with certain exemplary embodiments disclosed herein, the master-batch is heated (with mixing) to a temperature sufficient to melt at least a portion of the metal carboxylate prior to the final batch stage. Generally, this temperature is within 10° C. (+ or −) of the melt temperature of the particular metal carboxylate being utilized; as should be understood by those of skill in the art different metal carboxylates will have different melt temperatures and when in combination with other ingredients, e.g., in the master-batch, such melt temperature will differ from that of the pure metal carboxylate. In other embodiments heating of the master-batch to a temperature sufficient to melt the metal carboxylate is optional. In accordance with certain of the preceding embodiments disclosed herein, the master-batch is heated (with mixing) to a temperature of about 170° C. prior to final batch stage. Generally, the final batch stage mixing may be conducted at a temperature below the vulcanization temperature in order to avoid unwanted pre-cure of the rubber composition. Therefore, according to the previous parameters, the temperature of the productive mixing stage should not exceed about 120° C. and is typically about 40° C. to about 120° C., or about 60° C. to about 110° C. and, especially, about 75° C. to about 100° C.

In accordance with the current disclosure, the process for preparing the rubber compositions disclosed herein comprises:

(1) mixing a master-batch comprising (a) a conjugated diene polymer or copolymer component; (b) a reinforcing filler component comprising at least one of: (i) carbon black, (ii) silica and a silane coupling agent, and (iii) silica; and (c) from 0.5 to 40 phr of at least one metal carboxylate represented by formula (I):

$$(RCOO)_p M^{(p+n)+}(OH)_n, \qquad (I)$$

wherein:
R is a hydrocarbyl group having from 1 to 25 carbon atoms and optionally containing a heteroatom selected from a halogen atom, nitrogen, oxygen, and sulfur,
M is selected from the group consisting of aluminum, zinc, barium, calcium, magnesium, sodium, lithium, cadmium, cobalt, iron, tin, and zirconium, and
p+n equals the valency of M, and each of n and p are independently selected from an integer ranging from 0 to (p+n);

(2) mixing a final batch comprising (a) a curative component, wherein the curative component includes at least one of: a vulcanizing agent, a vulcanizing accelerator, a vulcanizing activator, a vulcanizing inhibitor, and an anti-scorching agent, and (b) the master-batch; and (3) vulcanizing the final batch.

In certain exemplary embodiments of the preceding process, particularly when the reinforcing filler component includes silica, the process further comprises remilling the master-batch. In accordance with certain of the preceding embodiments, when the reinforcing filler component includes silica, the remilling includes mixing in at least a portion of the silica with the master-batch. Furthermore, in certain of the preceding embodiments, the process further comprises heating the master-batch to a temperature sufficient to melt at least a portion of the metal carboxylate present in the master-batch prior to the step of mixing the final batch. In other embodiments, the process does not require heating the master-batch to a temperature sufficient to melt the metal carboxylates in the master-batch or even prior to curing.

In certain exemplary embodiments disclosed herein, the rubber compositions are employed in the manufacture of tires. These compositions can be processed into tire components according to ordinary tire manufacturing techniques including standard rubber shaping, molding, and curing techniques. Any of the various rubber tire components can be fabricated including, but not limited to, treads, sidewalls, belt skims, and carcass. Typically, vulcanization is effected by heating the vulcanizable composition in a mold; e.g., it may be heated to about 130° C. to about 180° C. Cured or crosslinked rubber compositions may be referred to as vulcanizates, which generally contain three-dimensional polymeric networks that are thermoset. The other ingredients, such as processing aides and fillers, may be evenly dispersed throughout the vulcanized network. Pneumatic tires can be made as discussed in U.S. Pat. Nos. 5,866,171, 5,876,527, 5,931,211, and 5,971,046, which are incorporated herein by reference. In accordance with one or more embodiments of this disclosure, at least a portion of a tire is formed from the rubber compositions disclosed herein. Furthermore, in accordance with certain exemplary embodiments of this disclosure, a tire having at least a portion of a tread as the rubber compositions disclosed herein is produced using the rubber composition.

Reduced Mooney Viscosity

The metal carboxylates disclosed herein provide the rubber compositions disclosed herein with an improved processability in the form of a reduced Mooney viscosity in unvulcanized (uncured) embodiments. The Mooney viscosity is one of the pertinent measures of processability in rubber formulations and compounding. A higher Mooney viscosity generally indicates a more viscous formulation, and thus, more difficult processing conditions, especially in those instances where reinforcing filler is incorporated into the rubber composition.

As mentioned above, it is typical for rubber compositions used in tires to contain a reinforcing filler, such as silica or carbon black. While reinforcing fillers may provide desirable properties to the rubber compositions (e.g., improved elasticity, strength, reduced rolling resistance, etc.), such fillers generally increase the Mooney viscosity, thereby making it more difficult to process the rubber composition. The use of the metal carboxylates disclosed herein in rubber compositions containing reinforcing filler reduces the Mooney viscosity, thereby improving the processability of the rubber composition. The metal carboxylates may be used in addition to, or in the place of other processing aids that operate to reduce Mooney viscosity, such as processing oils.

Prior to vulcanization, the rubber compositions disclosed and produced according to the current disclosure have a Mooney viscosity less than that of a comparative rubber composition, where the comparative rubber composition is the same except that the comparative rubber composition does not contain the at least one metal carboxylate. By stating that the comparative rubber composition "is the same except that the comparative rubber composition does not contain the at least one metal carboxylate" is meant that the ingredients of the comparative rubber composition (excepting the at least one metal carboxylate) are the same. In accordance with certain exemplary embodiments disclosed herein, the Mooney viscosity is 50% of that of the comparative rubber composition (i.e., 50% less than the Mooney viscosity of the comparative rubber composition), including 60%, 70%, 80%, 85%, 90%, and 96% of that of the comparative rubber composition. In certain exemplary embodiments disclosed herein, the Mooney viscosity is 50-95% of that of the comparative rubber composition, including 50-90%, 50-85%, 50-80%, 60-90%, 60-85% and 60-80% of that of the comparative rubber composition. In accordance with certain exemplary embodiments disclosed herein, the Mooney viscosity is 40% of that of the comparative rubber composition (i.e., 40% less than the Mooney viscosity of the comparative rubber composition), including 45%, 50% 60%, 70%, 80%, 85%, 90%, and 96% of that of the comparative rubber composition. In certain exemplary embodiments disclosed herein, the Mooney viscosity is 40-95% of that of the comparative rubber composition, including 40-90%, 40-85%, 40-80%, 45-95%, 45-90%, 45-85%, 45-80%, 50-95%, 50-90%, 50-85%, 50-80%, 60-95%, 60-90%, 60-85% and 60-80% of that of the comparative rubber composition.

Enhanced Elastic Modulus

In accordance with certain exemplary embodiments disclosed herein, the rubber compositions have an enhanced elastic modulus. The elastic modulus represents the tendency of the rubber composition to be deformed elastically when a force is applied to it. The elastic modulus is determined from a rubber composition in the vulcanized state.

As used herein, the phrases an "enhanced elastic modulus," "the elastic modulus is enhanced," an "elastic modulus enhancement," and the like are used interchangeably and refer to at least one of the following:

(A) the elastic modulus G' of the vulcanized rubber composition is at least 90% of that of a comparative rubber composition, i.e., greater than 90% of that of a comparative rubber composition, including from 90% to 130%, including from 95% to 130%, including from 100% to 130%, including from 101% to 130%, including from 90% to 125%, including from 95% to 120%, including from 100% to 116%, including from 101% to 120%, and including from 90% to 116% of that of the comparative rubber composition, where the comparative rubber composition is the same except that the comparative rubber composition does not contain the at least one metal carboxylate; or (B) the elastic modulus G' of the vulcanized rubber composition is the same or higher as compared to that of a comparative rubber composition, i.e., the G' is 100% or greater than that of the comparative rubber composition, including from 100% to 130%, including from 105% to 130%, including from 110% to 130%, including from 100% to 120%, including from 105% to 120%, including from 110% to 120%, including from 100 to 110%, where the comparative rubber composition is the same except that the comparative rubber composition does not contain the at least one metal carboxylate; or (C) the elastic modulus G' of the vulcanized rubber composition is the same or higher as compared to that of a comparative rubber composition that has an equivalent Mooney viscosity, i.e., the G' is 100% or greater than that of such comparative rubber composition, where the comparative rubber composition does not contain the at least one metal carboxylate but does contain at least one of a processing oil (e.g., an aromatic oil or a naphthenic oil).

The elastic modulus enhancements defined by (A), (B), and (C) above are not mutually exclusive, and therefore may overlap in definition. In other words, certain rubber compositions according to the embodiments disclosed herein may have a G' enhancement that meets the definitions of one or more of (A), (B), and (C) above. For example, an enhancement under (B), where the G' of the rubber composition is the same (100%) or higher than that of a comparative rubber composition, also satisfies the enhancement under (A).

In accordance with certain exemplary embodiments, the preferred metal carboxylates used to provide elastic modulus G' enhancement in the rubber compositions disclosed herein are aluminum carboxylates and zinc carboxylates (i.e., M from formula (I) is respectively selected from aluminum and zinc), more preferably aluminum carboxylates (i.e., M from formula (I) is selected from aluminum). In certain of the preceding embodiments showing G' enhancement, when M is aluminum (i.e., an aluminum carboxylate), the rubber composition has a reinforcing filler selected from (i) carbon black and (ii) silica and a silane coupling agent. In certain of the preceding embodiments showing G' enhancement, when M is zinc (i.e., an zinc carboxylate), the rubber composition has a carbon black reinforcing filler.

Decreased Hysteresis Loss

In accordance with certain exemplary embodiments disclosed herein, the rubber compositions have a decreased hysteresis loss as compared to a comparative rubber composition, where the comparative rubber composition is the same except that the comparative rubber composition does not contain the at least one metal carboxylate. The hysteresis loss represents the amount of mechanical energy from the rubber irreversibly converted into heat as a result of the deformation of the rubber. Generally one skilled in the art would expect a rubber composition with decreased Mooney viscosity (such as from the addition of processing oils) to have a decreased elastic modulus G' and for the hysteresis loss to increase along with the decrease in elastic modulus G'. In accordance with certain exemplary embodiments disclosed herein, the Mooney viscosity decreases with the addition of the metal carboxylate, but the elastic modulus G' either increases or is maintained to at least 90% of the comparative and the hysteresis loss decreases, as compared to the comparative rubber composition without the metal carboxylate. Thus, these rubber compositions exhibit a desirable decrease in Mooney viscosity along with a desirable decrease in hysteresis loss (translating to a decreased rolling resistance if the rubber composition were used in a tire tread), but without the magnitude of decrease in elastic modulus G' that would otherwise be expected; the preferred metal carboxylates used to provide this effect in the rubber compositions disclosed herein are aluminum carboxylates and zinc carboxylates (i.e., M from formula (I) is respectively selected from aluminum and zinc), more preferably aluminum carboxylates (i.e., M from formula (I) is selected from aluminum). In certain of the preceding embodiments showing G' enhancement, when M is aluminum (i.e., an aluminum carboxylate), the rubber composition has a reinforcing filler selected from (i) carbon black and (ii) silica and a silane coupling agent. In certain of the preceding embodiments showing G' enhancement, when M is zinc (i.e., an zinc carboxylate), the rubber composition has a carbon black reinforcing filler.

The following examples are for purposes of illustration only and are not intended to limit the scope of the claims which are appended hereto.

EXAMPLES

Example 1

Preparation of Aluminum Carboxylates

Example 1A

Preparation of Aluminum Tri(n-Octanoate)

20.4 grams of aluminum isopropoxide (0.1 mol) and 48 ml of octanic acid (0.3 mol) in 300 ml of dry toluene were refluxed with a Dean-Stark apparatus at 140-150° C. After removing the released isopropanol, the remaining solvent was stripped under vacuum. The octanoate chain of the product was confirmed by $^1$H-NMR. The aluminum content determined by ICP (Inductively Coupled Plasma) mass spectrometry analysis was 5.04% in comparison to 5.4% for the theoretical value.

Example 1B

Preparation of Aluminum Tri(n-Decanoate)

20.4 grams of aluminum isopropoxide (0.1 mol) and 64.2 ml of n-tridecanoic acid (0.3 mol) in 300 ml of dry toluene were refluxed with a Dean-Stark apparatus at 140-150° C. After removing the released isopropanol, the remaining solvent was stripped under vacuum. The tridecanoate chain of the product was confirmed by $^1$H-NMR. The aluminum content determined by ICP (Inductively Coupled Plasma) mass spectrometry analysis was 4.50% in comparison to 4.05% for the theoretical value.

Example 1C

Preparation of Aluminum Tri(5-Phenylbutanoate)

20.4 grams of aluminum isopropoxide (0.1 mol) and 53.4 g of 5-phenylvaleric acid (0.3 mol) in 300 ml of dry toluene were refluxed with a Dean-Stark apparatus at 140-150° C. After removing the released isopropanol, the remaining solvent was stripped under vacuum. The phenylbutanoate chain of the product was confirmed by $^1$H-NMR. The aluminum content determined by ICP (Inductively Coupled Plasma) mass spectrometry analysis was 5.06% in comparison to 4.84% for the theoretical value.

Example 1D

Preparation of Aluminum Trilinoleate 11 grams of aluminum isopropoxide (0.054 mol) and 50 ml of linoleic acid (0.16 mol) in 300 ml of dry toluene were refluxed with a Dean-Stark apparatus at 140-150° C. After removing the released isopropanol, the remaining solvent was stripped under vacuum. The linoleate chain of the product was confirmed by $^1$H-NMR. The aluminum content determined by ICP (Inductively Coupled Plasma) mass spectrometry analysis was 3.09% in comparison to 3.13% for the theoretical value.

Example 2

Compounding Evaluation of Rubber Formulations Containing Silica, a Silane Coupling Agent, and Aluminum Carboxylates Eight rubber compositions containing silica and a silane coupling agent were prepared in a three stage mixing process (i.e., master-batch, remilling, and final batch) according to the formulations shown in Table 1. The amounts of each ingredient used is reported as parts per hundred rubber (phr). The three-stage mixing process used for these formulations is outlined in Table 1A below. The compounding results of the formulations of Table 1 are shown in Table 2 below.

TABLE 1

Rubber Formulations

| Batch # | 1 | 2 | 3 | 4 | 5 | 6 | 7 | 8 |
|---|---|---|---|---|---|---|---|---|
| Master-Batch | | | | | | | | |
| S-SBR[a] | 100 | 100 | 100 | 100 | 100 | 100 | 100 | 100 |
| Silica[b] | 50 | 50 | 50 | 50 | 50 | 50 | 50 | 50 |
| Silane coupling agent[c] | 4.4 | 4.4 | 4.4 | 4.4 | 4.4 | 4.4 | 4.4 | 4.4 |
| 6PPD[d] | 1.0 | 1.0 | 1.0 | 1.0 | 1.0 | 1.0 | 1.0 | 1.0 |
| Dihydroxy-aluminum stearate[e] | — | 1 | 2 | 4 | — | — | — | — |
| Hydroxy-aluminum distearate[f] | — | — | — | — | 2 | 4 | — | — |
| Aluminum tristearate[g] | — | — | — | — | — | — | 2 | 4 |
| Final Batch | | | | | | | | |
| ZnO | 2.5 | 2.5 | 2.5 | 2.5 | 2.5 | 2.5 | 2.5 | 2.5 |
| MBTS[h] | 2.0 | 2.0 | 2.0 | 2.0 | 2.0 | 2.0 | 2.0 | 2.0 |
| DPG[i] | 1.4 | 1.4 | 1.4 | 1.4 | 1.4 | 1.4 | 1.4 | 1.4 |
| TBBS[j] | 0.7 | 0.7 | 0.7 | 0.7 | 0.7 | 0.7 | 0.7 | 0.7 |
| Sulfur | 1.4 | 1.4 | 1.4 | 1.4 | 1.4 | 1.4 | 1.4 | 1.4 |

[a]HX263/Duradyne ® 706 available from Firestone Polymers of Akron, Ohio, with a bound styrene content of 23.5%, vinyl bond content of 12%, and a glass transition temperature ($T_g$) of −62° C.
[b]Hi-Sil ™ 190 available from PPG Industries of Pittsburgh, Pennsylvania.
[c]Triethoxy silane available from Struktol of Stow, Ohio.
[d]Antioxidant, N-(1,3-Dimethylbutyl)-N'-phenyl-1,4-phenylenediamine available from Akron, Ohio.
[e]Available from Gelest of Morrisville, Pennsylvania.
[f]Available from Wako Pure Chemical of Osaka Japan.
[g]Available from Strem Chemicals of Newburyport, Massachusetts.
[h]2,2'-Dithiobis(benzothiazole).
[i]Diphenyl guanidine.
[j](N-tert-butyl-2-benzothiazole-sulfenamide).

TABLE 1A

Three Stage Mixing Parameters

| Stage | Time | Condition |
|---|---|---|
| Master-Batch Stage (initial temp: 100° C., rotor rpm started at 60) | 0 seconds | Charge polymers |
| | 30 seconds | Charge any oil, filler (e.g., any carbon black and/or silica) and other master-batch ingredients |
| | 300 seconds | Drop based on time or max temperature of 160° C. |
| Remill Stage (initial temp: 100° C., rotor rpm at 50) | 0 seconds | Charge Master-Batch |
| | 120 seconds | Drop on mixing time or max temperature of 130° C. |
| Final Batch Stage (initial temp: 70° C., rotor rpm at 40) | 0 seconds | Charge Remill |
| | 0 seconds | Charge curatives |
| | 120 seconds | Drop on mixing time or max temperature of 110° C. |

TABLE 2

Indexed Compounding Results for the Formulations of Table 1

| Batch # | 1 | 2 | 3 | 4 | 5 | 6 | 7 | 8 |
|---|---|---|---|---|---|---|---|---|
| Amount of Aluminum Carboxylate | 0 | 1 | 2 | 4 | 2 | 4 | 2 | 4 |
| $ML_{1+4}$ @ 130° C. | 100 | 85 | 83 | 71 | 81 | 72 | 82 | 73 |
| G' @ 50° C., 5% strain, 15 Hz | 100 | 96 | 96 | 98 | 97 | 100 | 96 | 97 |
| tan δ @ 50° C., 5% strain, 15 Hz | 100 | 94 | 93 | 90 | 94 | 92 | 91 | 88 |

For the formulations of Tables 1 and 2, batch 1 was the control because it has the same formulation as the others, but without any aluminum carboxylate. Batches 2-8 were prepared with varying amounts of aluminum carboxylates. The compounding results for the Mooney viscosity, the elastic modulus G', and the tan δ reported in Table 2 are indexed with respect to the control batch 1 (e.g., indexed Mooney viscosity of batch #2=(Mooney viscosity of batch #2)/(Mooney viscosity of control batch #1)×100). The indexed Mooney viscosity, elastic modulus G', and tan δ values disclosed herein can also be described as a percentage relative to the control corresponding to each batch (e.g., an indexed Mooney of 85 refers to a Mooney viscosity that is 85% of that of the control).

The Mooney viscosities disclosed herein were determined at 130° C. using an Alpha Technologies Mooney viscometer with a large rotor, a one minute warm-up time, and a four minute running time. More specifically, the Mooney viscosity was measured by preheating a sample from each batch to 130° C. for one minute before the rotor starts. The Mooney viscosity was recorded for each sample as the torque at four minutes after the rotor started.

As shown by the indexed values, batches 2-8 containing aluminum carboxylates show reduction of the Mooney viscosity compared to the control (ranging from about 70 to 85% of the control). In particular, the indexed values indicate that the Mooney viscosity decreases as the amount of aluminum carboxylate increases as shown in the following groupings of batches: 2-4, 5-6, and 7-8. For example, in batches 2-4, which contain the same aluminum carboxylate, the indexed Mooney viscosity is 85 in batch 2 (having 1 phr of dihydroxyaluminum stearate); the indexed Mooney is lower at 83 in batch 3 (having 2 phr of dihydroxyaluminum stearate), and is further lower in batch 4 at 71 (where batch 4 has 4 phr of dihydroxyaluminum stearate).

Viscoelastic properties of cured rubber compounds were measured by two different methods. G' was measured by a first method comprising a strain sweep conducted with an Advanced Rheometric Expansion System (ARES) from TA Instruments. The test specimen has a cylindrical button geometry having a diameter of 7.8 mm and a 6 mm length. The test is conducted using a frequency of 15 Hz. The temperature is held constant at the desired temperature, 50° C. The strain was swept from 0.25% to 14.75%.

Tan δ was measured using a second method comprising a dynamic compression test done with a Dynastat™ mechanical spectrometer (Dynastatics Instruments Corp.; Albany, N.Y.) using a cylindrical test specimen (7.8 mm diameter×6 mm height). The temperature is held constant at the desired temperature, 50° C. The sample is compressed under a static load of 2 kg before testing. After it reached an equilibrium state, the test started with a dynamic compression load of 1.25 kg at a frequency of 15 Hz. The sample was then dynamically compressed and then extended and the resultant hysteresis (tan δ) was then recorded. As is the case with the Mooney viscosity, the G' and tan δ results are shown in Table as values indexed with respect to the control batch. Table 2 shows that the formulations that contain the aluminum carboxylates, i.e., batches 2-8, have an elastic modulus G' index value of 96 or greater. As mentioned above, an elastic modulus G' having an indexed value of 90 or greater with respect to its control (or in other words, 90% of that of the control) is considered to show G' enhancement.

Furthermore, Table 2 shows that the indexed tan δ values for these rubber formulations is less than that of the control (i.e., the indexed values are less than 100, ranging from about 90 to 94% of the control). The measured tan δ of each batch represents hysteresis loss. A increase in tan δ relative to that of the control (i.e., an increase in the indexed tan δ relative to the control) shows greater hysteresis loss for the rubber as compared to the control. Conversely, a decrease in tan δ relative to that of the control (i.e., a decrease in the indexed tan δ relative to the control) shows less hysteresis loss as compared to the control. Here, because the indexed tan δ values are less than the control for batches 2-8, it is clear that the use of aluminum carboxylates in such formulations shown in Table 1 have less hysteresis loss as compared to the control.

Example 3

Compounding Evaluation of Rubber Formulations Containing Silica, a Silane Coupling Agent, Oil, and Aluminum Carboxylates Nine additional rubber compositions containing silica, a silane coupling agent, and processing oil according to the formulations shown in Table 3 were prepared in a similar manner as set forth in Example 2. The compounding results for the formulations shown in Table 3, measured and reported in the same manner as described above in Example 2, are shown below in Table 4.

As shown in Table 3, batch 1 is the control because it has the same formulation as the others, but without any aluminum carboxylate. Batches 2-9 each contain 4 phr of the various aluminum carboxylates. The values shown in Table 4 are the respective Mooney viscosity, G', and tan δ values indexed with respect to the control (batch 1).

The indexed values show that the Mooney viscosity for those formulations that contain the aluminum carboxylates, i.e., batches 2-9, are lower than the Mooney viscosity of the comparative formulation that does not contain the aluminum carboxylate, i.e., the control. The Mooney viscosities are about 70 to about 85% of the control Mooney viscosity.

Table 4 also shows that all of the formulations that contain the aluminum carboxylates except for batch 7 (where the aluminum carboxylate is aluminum tri(n-octanoate)), i.e., batches 2-6 and 8-9, have an elastic modulus G' index value of 90 or greater. As mentioned above, an elastic modulus G' having an indexed value of 90 or greater with respect to its control is considered to show G' enhancement. Notably, batches 2-4, 6, and 9 have indexed G' values greater than

TABLE 3

Rubber Formulations

| Batch # | 1 | 2 | 3 | 4 | 5 | 6 | 7 | 8 | 9 |
|---|---|---|---|---|---|---|---|---|---|
| Master-Batch | | | | | | | | | |
| S-SBR | 100 | 100 | 100 | 100 | 100 | 100 | 100 | 100 | 100 |
| Silica | 55 | 55 | 55 | 55 | 55 | 55 | 55 | 55 | 55 |
| Silane coupling agent | 4.4 | 4.4 | 4.4 | 4.4 | 4.4 | 4.4 | 4.4 | 4.4 | 4.4 |
| 6PPD | 1.0 | 1.0 | 1.0 | 1.0 | 1.0 | 1.0 | 1.0 | 1.0 | 1.0 |
| Oil[k] | 10 | 10 | 10 | 10 | 10 | 10 | 10 | 10 | 10 |
| Dihydroxyaluminum stearate | — | 4 | — | — | — | — | — | — | — |
| Hydroxyaluminum distearate | — | — | 4 | — | — | — | — | — | — |
| Aluminum tristearate | — | — | — | 4 | — | — | — | — | — |
| Aluminum Tridecanoate[l] | — | — | — | — | 4 | — | — | — | — |
| hydroxyaluminium di(2-ethylhexanoate) | — | — | — | — | — | 4 | — | — | — |
| Aluminum tri(n-octanoate)[m] | — | — | — | — | — | — | 4 | — | — |
| Aluminum tri(5-phenylbutanoate)[n] | — | — | — | — | — | — | — | 4 | — |
| Aluminum trilinoleate[o] | — | — | — | — | — | — | — | — | 4 |
| Final Batch | | | | | | | | | |
| ZnO | 2.5 | 2.5 | 2.5 | 2.5 | 2.5 | 2.5 | 2.5 | 2.5 | 2.5 |
| MBTS | 2.0 | 2.0 | 2.0 | 2.0 | 2.0 | 2.0 | 2.0 | 2.0 | 2.0 |
| DPG | 1.4 | 1.4 | 1.4 | 1.4 | 1.4 | 1.4 | 1.4 | 1.4 | 1.4 |
| TBBS | 0.7 | 0.7 | 0.7 | 0.7 | 0.7 | 0.7 | 0.7 | 0.7 | 0.7 |
| Sulfur | 1.4 | 1.4 | 1.4 | 1.4 | 1.4 | 1.4 | 1.4 | 1.4 | 1.4 |

*Unless otherwise indicated herein, the ingredients used in these formulations are the same as those from Table 1.
[k]Naphthenic oil.
[l]Prepared according to Example 1B.
[m]Prepared according to Example 1A.
[n]Prepared according to Example 1C.
[o]Prepared according to Example 1D.

TABLE 4

Indexed Compounding Results for the Formulations of Table 3

| Batch # | 1 | 2 | 3 | 4 | 5 | 6 | 7 | 8 | 9 |
|---|---|---|---|---|---|---|---|---|---|
| Amount of Aluminum Carboxylate | 0 | 4 | 4 | 4 | 4 | 4 | 4 | 4 | 4 |
| $ML_{1+4}$ @ 130° C. | 100 | 75 | 74 | 72 | 70 | 86 | 69 | 66 | 75 |
| G' @ 50° C., 5% strain, 15 Hz | 100 | 105 | 101 | 102 | 100 | 108 | 87 | 97 | 112 |
| tan δ @ 50° C., 5% strain, 15 Hz | 100 | 89 | 91 | 88 | 86 | 94 | 85 | 97 | 85 |

100, thereby indicating that the measured G' values are higher than that of the control.

Table 2 shows that the tan δ values for all of the aluminum carboxylate-containing formulations, i.e., batches 2-9, are less than 100, i.e., ranging from a low indexed value of 85 (batch 7) up to the high indexed value of 97 (batch 8) with the other batches having indexed tan δ values somewhere in between. This indicates that the rubber formulations compounded from batches 2-9 all have an actual tan δ less than that of the control. In other words, the rubbers of batches 2-9 show less hysteresis loss than that of the control under the tested conditions. As previously discussed, generally one skilled in the art would expect a rubber composition having a Mooney viscosity that is about 70 to about 85% of a control composition to have a lower G' and a higher tan δ. Instead, the rubbers of batches 2-9 have a lower Mooney and either a higher G' or a G' that is higher than would be expected for the amount of decrease in Mooney, along with a desirable decrease in tan δ. Overall, these rubber compositions show a desirable decrease in Mooney viscosity along with a desirable enhancement of G' and a desirable decrease in tan δ.

Example 4

Compounding Evaluation of Rubber Formulations Containing Silica and a Silane Coupling Agent and Aluminum Carboxylates Thirteen additional rubber compositions containing silica and a silane coupling agent according to the formulations shown Table 5A and 5B were prepared in a similar manner as set forth in Example 2. The compounding results for the formulations shown in Table 5, measured and reported in the same manner as described above in Example 2, are shown below in Table 6.

TABLE 5A

| Rubber Formulations | | | | | | | | | |
|---|---|---|---|---|---|---|---|---|---|
| Batch # | 1 | 2 | 3 | 4 | 5 | 6 | 7 | 8 | 9 |
| Master-Batch | | | | | | | | | |
| S-SBR | 100 | 100 | 100 | 100 | 100 | 100 | 100 | 100 | 100 |
| Silica | 50 | 50 | 50 | 50 | 50 | 50 | 50 | 50 | 50 |
| Silane coupling agent | 4.4 | 4.4 | 4.4 | 4.4 | 4.4 | 4.4 | 4.4 | 4.4 | 4.4 |
| 6PPD | 1.0 | 1.0 | 1.0 | 1.0 | 1.0 | 1.0 | 1.0 | 1.0 | 1.0 |
| Oil | — | 10.0 | — | — | — | — | — | — | — |
| Dihydroxy-aluminum stearate | — | — | 5.4 | 10.0 | 15.0 | 20.0 | — | — | |
| Aluminum tristearate | — | — | — | — | — | — | 10.0 | 13.6 | 20 |
| Final Batch | | | | | | | | | |
| ZnO | 2.5 | 2.5 | 2.5 | 2.5 | 2.5 | 2.5 | 2.5 | 2.5 | 2.5 |
| MBTS | 2.0 | 2.0 | 2.0 | 2.0 | 2.0 | 2.0 | 2.0 | 2.0 | 2.0 |
| DPG | 1.4 | 1.4 | 1.4 | 1.4 | 1.4 | 1.4 | 1.4 | 1.4 | 1.4 |
| TBBS | 0.7 | 0.7 | 0.7 | 0.7 | 0.7 | 0.7 | 0.7 | 0.7 | 0.7 |
| Sulfur | 1.4 | 1.4 | 1.4 | 1.4 | 1.4 | 1.4 | 1.4 | 1.4 | 1.4 |

*Unless otherwise indicated herein, the ingredients used in these formulations are the same as those from the preceding tables.

TABLE 6

| Indexed Compounding Results for the Formulations of Table 5A | | | | | | | | | |
|---|---|---|---|---|---|---|---|---|---|
| Batch # | 1 | 2 | 3 | 4 | 5 | 6 | 7 | 8 | 9 |
| Amount of Aluminum Carboxylate (from Tables 5A) | 0 | 0 | 5.4 | 10.0 | 15.0 | 20.0 | 10 | 13.6 | 20.0 |
| $ML_{1+4}$ @ 130° C. | 100 | 69 | 70 | 58 | 56 | 55 | 56 | 50 | 45 |
| G' @ 50° C., 5% strain, 15 Hz | 100 | 76 | 105 | 109 | 113 | 108 | 106 | 116 | 110 |
| tan δ @ 50° C., 5% strain, 15 Hz | 100 | 103 | 93 | 100 | 100 | 98 | 93 | 100 | 103 |

For the formulations shown in Tables 5 and 6, batch 1 is the control because it has the same formulation as the others, but without any aluminum carboxylate. Notably, batch 2 has the same formulation as the rest except that (1) batch 2 contains 10 phr of oil and (2) batch 2 does not contain any aluminum carboxylates. Batches 3-6 shown in these tables contain varying amounts of dihydroxyaluminum stearate. Batches 7-9 contain varying amounts of aluminum tristearate. The values shown in Table 6 are the respective Mooney viscosity, G', and tan δ values for batches 2-9 indexed with respect to the control (batch 1).

The indexed values show that the Mooney viscosity for those formulations that contain the aluminum carboxylates, i.e., batches 3-9, are lower than that of the control batch 1, i.e., the comparative formulation that does not contain the aluminum carboxylate. Furthermore, Table 6 shows that the formulations that contain the metal carboxylates can have equivalent or lower Mooney viscosities as compared to batch 1, but without the decrease in G' that occurs in batch 2 (batch 2 is the same formulation except that it contains processing oil and does not contain any aluminum carboxylates). For example, batch 2 has an indexed Mooney of 69, but a decreased value for indexed G', i.e., 76. Batches 3-9 have index Mooney viscosities which are either lower or commensurate with batch 2's Mooney viscosity, but are all lower than batch 1's Mooney viscosity and each have an indexed G' higher than not only batch 2, but also higher than batch 1.

In addition, Table 6 also shows a trend of decreasing Mooney viscosity as the amount of aluminum carboxylate increases for each type of aluminum carboxylate used. For example, batches 3-6 are formulations that contain dihydroxyaluminum stearate. As the amount of dihydroxyaluminum stearate increases, the Mooney viscosity decreases. Batches 7-9 contain varying amounts of aluminum tristearate. As the amount of aluminum tristearate increases in these batches, the Mooney viscosity decreases.

Table 6 also shows that the formulations that contain the aluminum carboxylates, i.e., batches 3-9 have indexed G' values greater than 100, thereby indicating that the measured G' values are higher than that of the control. This also indicates G' enhancement as defined herein.

Furthermore, Table 6 shows that the indexed tan δ values for all of the aluminum carboxylate-containing formulations except for batch 9, i.e., batches 3-8, are the same (100) or lower than that of the control. This indicates that the rubbers compounded from batches 3-8 all have an actual tan δ less than (or no higher than) that of the control, and consequently that the rubbers of batches 3-8 show less hysteresis loss than that of the control under the tested conditions. Given that, as mentioned above, one skilled in the art would typically expect a lower Mooney viscosity rubber composition to have a decreased G' and an increase tan δ, the overall effect of lowered Mooney viscosity, along with a desirable increase in G' and no increase in tan δ is unexpected and surprising.

Example 5

Compounding Evaluation of Rubber Formulations Containing Silica and Aluminum Carboxylates, but without a Silane Coupling Agent Eight additional rubber compositions containing silica without a silane coupling agent according to the formulations shown Table 7 were prepared in a similar manner as set forth in Example 2. The compounding results for the formulations shown in Table 5, measured and reported in the same manner as described above in Example 2, are shown below in Table 8.

TABLE 7

Rubber Formulations

| Batch # | 1 | 2 | 3 | 4 | 5 | 6 | 7 | 8 |
|---|---|---|---|---|---|---|---|---|
| Master-Batch | | | | | | | | |
| S-SBR | 100 | 100 | 100 | 100 | 100 | 100 | 100 | 100 |
| Silica | 40 | 40 | 40 | 40 | 40 | 40 | 40 | 40 |
| 6PPD | 1.0 | 1.0 | 1.0 | 1.0 | 1.0 | 1.0 | 1.0 | 1.0 |
| Dihydroxy-aluminum stearate | — | 1 | 2 | 4 | 0 | 0 | 0 | 0 |
| Hydroxy-aluminum distearate | — | 0 | 0 | 0 | 2 | 4 | 0 | 0 |
| Aluminum tristearate | — | 0 | 0 | 0 | 0 | 0 | 2 | 4 |
| Final Batch | | | | | | | | |
| ZnO | 2.5 | 2.5 | 2.5 | 2.5 | 2.5 | 2.5 | 2.5 | 2.5 |
| MBTS | 2.0 | 2.0 | 2.0 | 2.0 | 2.0 | 2.0 | 2.0 | 2.0 |
| DPG | 1.4 | 1.4 | 1.4 | 1.4 | 1.4 | 1.4 | 1.4 | 1.4 |
| TBBS | 0.7 | 0.7 | 0.7 | 0.7 | 0.7 | 0.7 | 0.7 | 0.7 |
| Sulfur | 1.4 | 1.4 | 1.4 | 1.4 | 1.4 | 1.4 | 1.4 | 1.4 |

*Unless otherwise indicated herein, the ingredients used in these formulations are the same as those from the preceding tables.

TABLE 8

Indexed Compounding Results for the Formulations of Table 7

| Batch # | 1 | 2 | 3 | 4 | 5 | 6 | 7 | 8 |
|---|---|---|---|---|---|---|---|---|
| Amount of Aluminum Carboxylate | 0 | 1 | 2 | 4 | 2 | 4 | 2 | 4 |
| $ML_{1+4}$ @ 130° C. | 100 | 94 | 92 | 85 | 92 | 84 | 89 | 81 |
| G' @ 50° C., 5% strain, 15 Hz | 100 | 101 | 101 | 95 | 102 | 92 | 99 | 93 |
| tan δ @ 50° C., 5% strain, 15 Hz | 100 | 88 | 86 | 79 | 86 | 78 | 83 | 76 |

For the formulations shown in Tables 7 and 8, batch 1 is the control because it has the same formulation as the others, but without any aluminum carboxylate. Batches 2-4 shown in these tables contain varying amounts of dihydroxyaluminum stearate; batches 5-6 contain varying amounts of hydroxyaluminum distearate; and batches 7-8 contain varying amounts of aluminum tristearate.

The values shown in Table 8 are the respective Mooney viscosity, G', and tan δ values indexed with respect to the control (batch 1).

Notably, the indexed values show that the Mooney viscosity for those formulations that contain the aluminum carboxylates, i.e., batches 2-8, are lower than the that of the control. In addition, Table 8 also shows that for each type of aluminum carboxylate, the Mooney viscosity decreases as the amount of the aluminum carboxylate increases. For example, batches 2-4 are formulations that contain dihydroxyaluminum stearate. As the amount of dihydroxyaluminum stearate increases in batches 2-4, the Mooney viscosity decreases. Batches 5-6 contain varying amounts of hydroxyaluminum distearate. Again, as the amount of hydroxyaluminum distearate increases in these batches, the Mooney viscosity decreases. Lastly, batches 7-8 contain varying amounts of aluminum tristearate. As the amount of aluminum tristearate increases, Table 8 shows a Mooney viscosity decrease for these batches.

Table 8 also shows that the formulations that contain the aluminum carboxylates, i.e., batches 2-8, have an elastic modulus G' index value of 92 or greater. As mentioned above, an elastic modulus G' having an indexed value of 90 or greater with respect to its control is considered to show G' enhancement. Notably, batches 2, 4, and 6 have indexed G' values greater than 100, thereby indicating that the measured G' values are higher than that of the control.

Furthermore, Table 8 shows that the tan δ values for all of the aluminum carboxylate-containing formulations, i.e., batches 2-8, are less than 100, i.e., ranging from a low indexed value of 76 (batch 8) up to the high indexed value of 88 (batch 2) with the other batches having indexed tan δ values somewhere in between. This indicates that the rubbers compounded from batches 2-8 all have an actual tan δ less than that of the control. In other words, the rubbers of batches 2-8 show less hysteresis loss than that of the control under the tested conditions. For the reasons discussed above, given that one skilled in the art would typically expect a lower Mooney viscosity rubber composition to have a decreased G' and an increase tan δ, the overall effect of lowered Mooney viscosity, along with a desirable increase in G' and no increase in tan δ is unexpected and surprising.

In addition, as mentioned above, batches 2-4 contain one type of aluminum carboxylate, batches 5-6 another type of aluminum carboxylate, and batches 7-8 yet another aluminum carboxylate. The results of Table 8 show that within each of these groupings, as the amount of aluminum carboxylate increases, the tan δ decreases. Without intending to be bound by any theory, this may indicate that the amount of aluminum carboxylate shares an inverse relationship with the tan δ (i.e., hysteresis loss) in formulations containing a silica reinforcing filler and no silane coupling agent.

Example 6

Compounding Evaluation of Rubber Formulations Containing Silica with and without a Silane Coupling Agent and Aluminum Carboxylates Four additional rubber compositions containing silica, two batches with and two batches without a silane coupling agent, according to the formulations shown Table 9 were prepared in a similar manner as those in Example 2.

TABLE 9

Rubber Formulations

| Batch # | 1 | 2 | 3 | 4 |
|---|---|---|---|---|
| Master-Batch | | | | |
| S-SBR | 100 | 100 | 100 | 100 |
| Silica | 50 | 50 | 40 | 40 |
| Silane coupling agent | 4.4 | 4.4 | — | — |
| 6PPD | 1.0 | 1.0 | 1.0 | 1.0 |
| Dihydroxyaluminum stearate | 0 | 5.4 | 0 | 5.4 |
| Remill | | | | |
| Compositions mixed at master-batch | 155.4 | 160.8 | 141.0 | 146.4 |
| Final Batch | | | | |
| Composition mixed at remill | 155.4 | 160.8 | 141.0 | 146.4 |
| ZnO | 2.5 | 2.5 | 2.5 | 2.5 |
| MBTS | 2.0 | 2.0 | 2.0 | 2.0 |
| DPG | 1.4 | 1.4 | 1.4 | 1.4 |
| TBBS | 0.7 | 0.7 | 0.7 | 0.7 |
| Sulfur | 1.4 | 1.4 | 1.4 | 1.4 |

*Unless otherwise indicated herein, the ingredients used in these formulations are the same as those from the preceding tables.

TABLE 10

Indexed Compounding Results for the Formulations of Table 9

| Batch # | 1 | 2 | 3 | 4 |
|---|---|---|---|---|
| Amount of Aluminum Carboxylate | 0 | 5.4 | 0 | 5.4 |
| $ML_{1+4}$ @ 130° C. | 100 | 68 | 100 | 72 |
| G' @ 50° C., 5% strain, 15 Hz | 100 | 95 | 100 | 67 |
| tan δ @ 50° C., 5% strain, 15 Hz | 100 | 95 | 100 | 85 |

For the formulations shown in Tables 9 and 10, batch 1 is a control for batch 2, because batch 1 is the same as batch 2 except for the aluminum carboxylate. Batch 3 is a control for batch 4, because batch 3 is the same as batch 4 except for the aluminum carboxylate. Batch 1 and batch 3 differ with respect to the presence of a silane coupling agent. Batch 1 contains 4.4 phr of a silane coupling agent, and batch 3 does not. The values shown in Table 10 are the respective Mooney viscosity, G', and tan δ values indexed based on the respective controls (batch 1 or batch 3).

The indexed values show that the Mooney viscosity for those formulations that contain the aluminum carboxylates, i.e., batches 2 and 4, are lower than that of their respective control. Table 10 also shows that batch 2, which contains both the aluminum carboxylate and silica plus silane coupling agent, has an indexed elastic modulus G' of 95 (based on control 1), which is considered an elastic modulus enhancement as defined herein. Batch 4, which contains the aluminum carboxylate and silica but does not contain a silane coupling agent, does not show such G' enhancement relative to its control as defined herein.

The tan δ values for the formulations containing the aluminum carboxylates (batches 2 and 4) are lower than their respective controls (batches 1 and 3), thereby showing less hysteresis loss as compared to their respective controls.

Example 7

Compounding Evaluation of Rubber Formulations Containing Silica, a Silane Coupling Agent, and Various Metal Carboxylates Seven additional rubber compositions containing silica and a silane coupling agent according to the formulations shown in Table 11 were prepared in a similar manner as set forth in Example 2. The compounding results for the formulations shown in Table 11, measured and reported in the same manner as described above in Example 2, are shown below in Table 12.

TABLE 11

Rubber Formulations

| Batch # | 1 | 2 | 3 | 4 | 5 | 6 | 7 |
|---|---|---|---|---|---|---|---|
| Master-Batch | | | | | | | |
| S-SBR | 100 | 100 | 100 | 100 | 100 | 100 | 100 |
| Silica | 50 | 50 | 50 | 50 | 50 | 50 | 50 |
| Silane coupling agent | 4.4 | 4.4 | 4.4 | 4.4 | 4.4 | 4.4 | 4.4 |
| 6PPD | 1.0 | 1.0 | 1.0 | 1.0 | 1.0 | 1.0 | 1.0 |
| Lithium monostearate[s] | — | 4 | — | — | — | — | — |
| Sodium monostearate[t] | — | — | 4 | — | — | — | — |
| Magnesium distearate[u] | — | — | — | 4 | — | — | — |

TABLE 11-continued

Rubber Formulations

| Batch # | 1 | 2 | 3 | 4 | 5 | 6 | 7 |
|---|---|---|---|---|---|---|---|
| Calcium distearate[v] | — | — | — | — | 4 | — | — |
| Zinc distearate[w] | — | — | — | — | — | 4 | — |
| Barium distearate[x] | — | — | — | — | — | — | 4 |
| Final Batch | | | | | | | |
| ZnO | 2.5 | 2.5 | 2.5 | 2.5 | 2.5 | 2.5 | 2.5 |
| MBTS | 2.0 | 2.0 | 2.0 | 2.0 | 2.0 | 2.0 | 2.0 |
| DPG | 1.4 | 1.4 | 1.4 | 1.4 | 1.4 | 1.4 | 1.4 |
| TBBS | 0.7 | 0.7 | 0.7 | 0.7 | 0.7 | 0.7 | 0.7 |
| Sulfur | 1.4 | 1.4 | 1.4 | 1.4 | 1.4 | 1.4 | 1.4 |

*Unless otherwise indicated herein, the ingredients used in these formulations are the same as those from Table 1.
[s]Available from TCI America of Portland, Oregon.
[t] Available from Sigma-Aldrich of St. Louis, Missouri.
[u]Available from Sigma-Aldrich.
[v]Available from TCI America.
[w]Available from Sigma-Aldrich.
[x]Available from TCI America.

TABLE 12

Indexed Compounding Results for the Formulations of Table 11

| Batch # | 1 | 2 | 3 | 4 | 5 | 6 | 7 |
|---|---|---|---|---|---|---|---|
| Amount of Metal Carboxylate | 0 | 4 | 4 | 4 | 4 | 4 | 4 |
| ML$_{1+4}$ @ 130° C. | 100 | 73 | 76 | 69 | 74 | 74 | 80 |
| G' @ 50° C., 5% strain, 15 Hz | 100 | 81 | 89 | 85 | 85 | 93 | 86 |
| tan δ @ 50° C., 5% strain, 15 Hz | 100 | 72 | 73 | 78 | 78 | 86 | 78 |

For the formulations shown in Tables 11 and 12, batch 1 is the control because it has the same formulation as the others, but without any metal carboxylate. Batches 2-7 shown in these tables contain each contain 4 phr of different metal carboxylates. In particular batch 2 contains lithium monostearate; batch 3 contains sodium monostearate; batch 4 contains magnesium distearate; batch 5 contains calcium distearate; batch 6 contains zinc distearate; and batch 7 contains barium distearate. The values shown in Table 12 are the respective Mooney viscosity, G', and tan δ values indexed with respect to the control (batch 1).

Notably, the indexed values show that the Mooney viscosity for those formulations that contain the metal carboxylates, i.e., batches 2-7, are lower than the that of the control (batch 1).

Table 12 also shows that the formulations that contain the lithium, sodium, magnesium, calcium, zinc, and barium carboxylates (formulated with a silica reinforcing filler and silane coupling agent) have a decreased elastic modulus G' as compared to the control. For example, the lowest indexed G' for batches 2-7 is the lithium monostearate of batch 2, which has an indexed G' of 81, and the highest for these batches is zinc distearate of batch 6 at an indexed G' of 93. As mentioned above, when an indexed elastic modulus G' that has a value of 90 or greater with respect to its control, it is considered to show G' enhancement. Here, batch 6 containing the zinc distearate has an indexed G' value greater than 90, thereby showing enhanced G' as defined herein.

Furthermore, Table 12 shows that the indexed tan δ values for all of the metal carboxylate-containing formulations, i.e., batches 2-7, are lower than that of the control of batch 1. This indicates that the silica reinforced formulations compounded from batches 2-7 that contain lithium monostearate (batch 2), sodium monostearate (batch 3), magnesium distearate (batch 4), calcium distearate (batch 5), zinc distearate (batch 6), barium distearate (batch 7) all have an actual tan δ less than that of the control, and consequently less hysteresis loss than that of the control.

Example 8

Compounding Evaluation of Rubber Formulations Containing Carbon Black, Oil, and Aluminum Carboxylates Three additional rubber compositions containing carbon black and processing oil according to the formulations shown in Table 13 were prepared in a similar manner as set forth in Example 2 except that the remill stage was eliminated. The compounding results for the formulations shown in Table 13, measured and reported in the same manner as described above in Example 2, are shown below in Table 14.

TABLE 13

Rubber Formulations

| Batch # | 1 | 2 | 3 |
|---|---|---|---|
| Master-Batch | | | |
| S-SBR | 100 | 100 | 100 |
| Carbon Black[y] | 50 | 50 | 50 |
| Oil | 10 | 10 | 10 |
| Stearic acid | 2 | 2 | 2 |
| Wax | 2 | 2 | 2 |
| 6PPD | 0.95 | 0.95 | 0.95 |
| Dihydroxyaluminum stearate | — | 4 | — |
| Aluminum tristearate | — | — | 4 |
| Final Batch | | | |
| ZnO | 2.5 | 2.5 | 2.5 |
| MBTS | 0.5 | 0.5 | 0.5 |
| DPG | 0.3 | 0.3 | 0.3 |
| TBBS | 0.5 | 0.5 | 0.5 |
| Sulfur | 1.5 | 1.5 | 1.5 |

*Unless otherwise indicated herein, the ingredients used in these formulations are the same as those from Table 1.
[y]HAF grade.

TABLE 14

Indexed Compounding Results for the Formulations of Table 13

| Batch # | 1 | 2 | 3 |
|---|---|---|---|
| Amount of Metal Carboxylate | 0 | 4 | 4 |
| ML$_{1+4}$ @ 130° C. | 100 | 88 | 85 |
| G' @ 50° C., 5% strain, 15 Hz | 100 | 111 | 113 |
| tan δ @ 50° C., 5% strain, 15 Hz | 100 | 96 | 100 |

Batch 1 is the control because it contains the same formulation as the others but without the aluminum carboxylate. The values shown in Table 14 are the respective Mooney viscosity, G', and tan δ values indexed with respect to the control (batch 1).

Notably, the indexed values show that the Mooney viscosity for those formulations that contain the aluminum carboxylates, i.e., batches 2-3, are lower than the that of the control (batch 1).

Table 14 also shows that the indexed elastic modulus G' for these carbon black reinforced rubber formulations is significantly higher than the control. For batch 2, the indexed G' as compared to the control is 111. For batch 3, the indexed G' value is 113.

In addition, the indexed tan δ values are the same (batch 3 at 100) or lower (batch 2 at 96) than the control, thereby showing the same or less hysteresis loss compared to the control. As discussed above, an increase in G' coupled with a lack of increase in tan δ in a lower Mooney viscosity rubber composition (i.e., batches 2 and)3 is unexpected.

Example 9

Compounding Evaluation of Rubber Formulations Containing Carbon Black, Oil, and Various Metal Carboxylates Seven additional rubber compositions containing carbon black and processing oil according to the formulations shown in Table 15 were prepared in a similar manner as set forth in Example 2 except that the remill stage was eliminated. The compounding results for the formulations shown in Table 15, measured and reported in the same manner as described above in Example 2, are shown below in Table 16.

monostearate; batch 5 contains magnesium distearate; batch 6 contains calcium distearate; and batch 7 contains barium distearate. The values shown in Table 16 are the respective Mooney viscosity, G', and tan δ values indexed with respect to the control (batch 1).

Notably, the indexed values show that the Mooney viscosity for those formulations that contain the metal carboxylates, i.e., batches 2-7, are lower than the that of the control.

Table 16 also shows that all of the various metal carboxylate-containing formulations have an increased elastic modulus G' as compared to the control. For example, the lowest indexed G' for batches 2-7 is the calcium monostearate of batch 6, which has an indexed G' of 102. The highest for these batches is zinc distearate of batch 3 at an indexed G' of 119. As all of the batches have a higher indexed G' than the control (i.e., greater than 100), these batches containing the different metal carboxylates are considered to show G' enhancement as described herein.

Furthermore, Table 16 shows that the indexed tan δ values for only two of the metal carboxylate-containing formulations, i.e., batches 2 and 3, are the same (100) or lower than that of the control (batch 1). Particularly, batch 2, which is

TABLE 15

Rubber Formulations

| Batch # | 1 | 2 | 3 | 4 | 5 | 6 | 7 |
|---|---|---|---|---|---|---|---|
| Master-Batch | | | | | | | |
| S-SBR | 100 | 100 | 100 | 100 | 100 | 100 | 100 |
| Carbon black | 50 | 50 | 50 | 50 | 50 | 50 | 50 |
| Oil | 10 | 10 | 10 | 10 | 10 | 10 | 10 |
| Stearic acid | 2 | 2 | 2 | 2 | 2 | 2 | 2 |
| Wax | 2 | 2 | 2 | 2 | 2 | 2 | 2 |
| 6PPD | 0.95 | 0.95 | 0.95 | 0.95 | 0.95 | 0.95 | 0.95 |
| Aluminum tristearate | — | 4 | — | — | — | — | — |
| Zinc distearate | — | — | 4 | — | — | — | — |
| Lithium monostearate | — | — | — | 4 | — | — | — |
| Magnesium distearate | — | — | — | — | 4 | — | — |
| Calcium distearate | — | — | — | — | — | 4 | — |
| Barium distearate | — | — | — | — | — | — | 4 |
| Final Batch | | | | | | | |
| ZnO | 2.5 | 2.5 | 2.5 | 2.5 | 2.5 | 2.5 | 2.5 |
| MBTS | 0.5 | 0.5 | 0.5 | 0.5 | 0.5 | 0.5 | 0.5 |
| DPG | 0.3 | 0.3 | 0.3 | 0.3 | 0.3 | 0.3 | 0.3 |
| TBBS | 0.5 | 0.5 | 0.5 | 0.5 | 0.5 | 0.5 | 0.5 |
| Sulfur | 1.5 | 1.5 | 1.5 | 1.5 | 1.5 | 1.5 | 1.5 |

*Unless otherwise indicated herein, the ingredients used in these formulations are the same as those from Table 1.

TABLE 16

Indexed Compounding Results for the Formulations of Table 15

| Batch # | 1 | 2 | 3 | 4 | 5 | 6 | 7 |
|---|---|---|---|---|---|---|---|
| Amount of Metal Carboxylate | 0 | 4 | 4 | 4 | 4 | 4 | 4 |
| $ML_{1+4}$ @ 130° C. | 100 | 85 | 79 | 91 | 93 | 93 | 96 |
| G' @ 50° C., 5% strain, 15 Hz | 100 | 113 | 119 | 108 | 104 | 102 | 108 |
| tan δ @ 50° C., 5% strain, 15 Hz | 100 | 100 | 99 | 104 | 107 | 108 | 106 |

For the formulations shown in Tables 15 and 16, batch 1 is the control as it has the same formulation as the others, but without any metal carboxylate. Batches 2-7 shown in these tables contain each contain 4 phr of different metal carboxylates. In particular batch 2 contains aluminum tristearate; batch 3 contains zinc distearate; batch 4 for contains lithium formulated with the aluminum tristearate, has the same tan δ as the control, and batch 3, which is formulated with the zinc distearate, has a tan δ less than that of the control. Thus, batches 2 and 3 are the only two batches reported in Table 16 that have the same or less hysteresis loss compared to the control. As discussed above, an increase in G' coupled with a lack of increase in tan δ in a lower Mooney viscosity rubber composition (i.e., batches 2 and 3) is unexpected.

Unless otherwise indicated herein, all sub-embodiments and optional embodiments are respective sub-embodiments and optional embodiments to all embodiments described herein. While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus, and illustrative examples shown and described. Accordingly, departures may be made from such details without departing from the spirit or scope of the applicant's general inventive concept. All patents and published patent applications referred to herein, are explicitly incorporated by reference herein.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, *A Dictionary of Modern Legal Usage* 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

As used in the description of the invention and the appended claims, the singular forms "a," "an," and "the" are intended to include the plural forms as well, unless the context clearly indicates otherwise.

What is claimed is:

1. A vulcanizable rubber composition comprising:
    (a) a conjugated diene polymer or copolymer component;
    (b) a reinforcing filler component comprising at least one of:
        (i) carbon black,
        (ii) silica and a silane coupling agent, and
        (iii) silica; and
    (c) a fatty acid component consisting of
        (i) from 0.5 to 40 phr of at least one metal carboxylate represented by the formula:

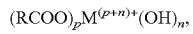
    $(RCOO)_p M^{(p+n)+}(OH)_n,$ wherein:
    R is a hydrocarbyl group having from 1 to 25 carbon atoms and optionally containing a heteroatom selected from a halogen atom, nitrogen, oxygen, and sulfur,
    M is aluminum, and
    p+n equals the valency of M, and each of n and p are independently selected from an integer ranging from 0 to (p+n); and
        (ii) optionally stearic acid,
    wherein the only fatty acid component consists of (c)(i), optionally in combination with (c)(ii).

2. The vulcanizable rubber composition of claim 1, wherein n is 0.

3. The vulcanizable rubber composition of claim 1, wherein n is 2.

4. The vulcanizable rubber composition of claim 1, wherein at least one of the following is met:
    a. the reinforcing filler comprises no more than 10 phr of carbon black; or
    b. the reinforcing filler comprises no more than 1 phr of silane coupling agent.

5. The vulcanizable rubber composition of claim 1, wherein the at least one metal carboxylate comprises at least one of: dihydroxyaluminum stearate, hydroxyaluminum distearate, aluminum tristearate, aluminum tri(n-decanoate), hydroxyaluminum di(2-ethylhexanoate), aluminum tri(n-octanoate), aluminum tri(5-phenylbutanoate), aluminum trilinoleate, zinc distearate, barium distearate, calcium distearate, magnesium distearate, sodium monostearate, or lithium monostearate.

6. The vulcanizable rubber composition of claim 1, wherein when unvulcanized, the Mooney viscosity ($ML_{1+4}$ at 130° C.) of the composition is less than that of a comparative rubber composition, wherein the comparative rubber composition is the same except that the comparative rubber composition does not contain the at least one metal carboxylate.

7. The vulcanizable rubber composition of claim 1, wherein the reinforcing filler component comprises silica and silane coupling agent and the silane coupling agent is present in an amount from 0.01 to 25% by weight of the silica.

8. The vulcanizable rubber composition of claim 1, wherein the reinforcing filler comprises carbon black.

9. The vulcanizable rubber composition of claim 1, wherein when vulcanized, the G' (at 50° C., 5% strain, 15 Hz) of the composition is enhanced as compared to that of a comparative rubber composition, wherein the comparative rubber composition is the same except that the comparative rubber composition does not contain the at least one metal carboxylate.

10. The vulcanizable rubber composition of claim 9, wherein when vulcanized, the rubber composition has a G' (at 50° C., 5% strain, 15 Hz) that is at least 90% of that of a comparative rubber composition, wherein the comparative rubber composition is the same except that the comparative rubber composition does not contain the at least one metal carboxylate.

11. The vulcanizable rubber composition of claim 9, wherein when vulcanized, the hysteresis loss (at 50° C., 5% strain, 15 Hz) of the composition is the same or less as compared to that of a comparative rubber composition, wherein the comparative rubber composition is the same except that the comparative rubber composition does not contain the at least one metal carboxylate.

12. The vulcanizable rubber composition of claim 1, wherein R has from 4 to 20 carbon atoms.

13. The vulcanizable rubber composition of claim 1, wherein the at least one metal carboxylate comprises at least one of an aluminum tricarboxylate, a dihydroxyaluminum carboxylate, or a hydroxyaluminum dicarboxylate.

14. The vulcanizable rubber composition of claim 1, wherein the at least one metal carboxylate comprises at least one of dihydroxyaluminum stearate, hydroxyaluminum distearate, aluminum tristearate, aluminum tri(n-decanoate), hydroxyaluminum di(2-ethylhexanoate), aluminum tri(n-octanoate), aluminum tri(5-phenylbutanoate), or aluminum trilinoleate.

15. The vulcanizable rubber composition of claim 1, wherein the composition comprises 5 to 200 phr of the reinforcing filler component.

16. The vulcanizable rubber composition of claim 1, wherein the at least one metal carboxylate is present in an amount of 0.5 to 20 phr.

17. The vulcanizable rubber composition of claim 1, wherein the conjugated diene polymer or copolymer component includes at least one silica-reactive functionalized conjugated diene polymer or copolymer.

18. The vulcanizable rubber composition of claim 1, wherein the composition further comprises a curative component, and the curative component includes at least one of:

a vulcanizing agent, a vulcanizing accelerator, a vulcanizing activator, a vulcanizing inhibitor, and an anti-scorching agent.

19. A vulcanizable rubber composition comprising:
(a) a conjugated diene polymer or copolymer component including at least one of styrene-butadiene rubber, polybutadiene, natural rubber, or polyisoprene;
(b) 5-200 phr of a reinforcing filler component comprising at least one of:
  (i) carbon black,
  (ii) silica and a silane coupling agent, and
  (iii) silica; and
(c) a fatty acid component consisting of
  (i) from 0.5 to 20 phr of at least one metal carboxylate represented by the formula:

$(RCOO)_p M^{(p+n)+}(OH)_n$, wherein:

R is a hydrocarbyl group having from 1 to 25 carbon atoms and optionally containing a heteroatom selected from a halogen atom, nitrogen, oxygen, and sulfur,
  M is aluminum, and
  p+n equals the valency of aluminum, and each of n and p are independently selected from an integer ranging from 0 to (p+n), and
  (ii) optionally stearic acid,
wherein the only fatty acid component consists of (c)(i), optionally in combination with (c)(ii).

20. The vulcanizable rubber composition of claim 19, wherein n is 0.

21. The vulcanizable rubber composition of claim 19, wherein n is 2.

* * * * *